United States Patent
Donahue et al.

(10) Patent No.: US 8,024,423 B2
(45) Date of Patent: Sep. 20, 2011

(54) MAINTAINING CONNECTIONS BETWEEN MOBILE DEVICES AND SERVERS

(75) Inventors: Brett Donahue, Eagle, ID (US); Eric Lewis Nelson, Boise, ID (US)

(73) Assignee: iAnywhere Solutions, Inc., Dublin, CA (US)

( * ) Notice: Subject to any disclaimer, the term of this patent is extended or adjusted under 35 U.S.C. 154(b) by 86 days.

(21) Appl. No.: 12/432,339

(22) Filed: Apr. 29, 2009

(65) Prior Publication Data

US 2010/0281118 A1 Nov. 4, 2010

(51) Int. Cl.
 G06F 15/16 (2006.01)
 G06F 15/177 (2006.01)
 G06F 15/173 (2006.01)
(52) U.S. Cl. .................. 709/217; 709/220; 709/223
(58) Field of Classification Search .................. 709/217, 709/223, 229–230, 220
 See application file for complete search history.

(56) References Cited

U.S. PATENT DOCUMENTS

| | | | |
|---|---|---|---|
| 6,212,175 B1 * | 4/2001 | Harsch | 370/338 |
| 7,343,398 B1 * | 3/2008 | Lownsbrough | 709/218 |
| 7,406,061 B2 * | 7/2008 | Harsch | 370/328 |
| 7,577,749 B1 * | 8/2009 | Long | 709/230 |
| 7,665,147 B2 * | 2/2010 | Sullivan | 726/29 |
| 7,774,007 B2 * | 8/2010 | Backholm et al. | 455/466 |
| 7,810,089 B2 * | 10/2010 | Sundarrajan et al. | 717/174 |

* cited by examiner

*Primary Examiner* — Hussein Elchanti

(74) *Attorney, Agent, or Firm* — Sterne, Kessler, Goldstein & Fox P.L.L.C.

(57) ABSTRACT

A system, method, and computer-readable medium having computer-executable instructions for maintaining connections between a mobile device and a server are described herein. In an embodiment, the method operates by receiving a data request from the mobile device, the data request identifying at least a timeout interval. The method comprises sending the data request to a data server and then determining whether the timeout interval has passed. The method also comprises sending a keep alive message to the mobile device indicating that the request has timed out if it is determined that the timeout interval has passed. The method then receives a re post request from the mobile device, the re post request identifying a timeout interval. The method further comprises receiving a response from the data server, the response including at least data requested by the mobile device and then sends the response to the mobile device.

20 Claims, 14 Drawing Sheets

MAINTAINING CONNECTIONS BETWEEN MOBILE DEVICES AND SERVERS

FIELD OF THE INVENTION

The present invention relates generally to mobile communications and, more particularly, to maintaining data connections between mobile client devices and servers.

BACKGROUND OF THE INVENTION

Mobile devices are in common usage, many featuring powerful processors, larger and more colorful displays, and wireless networking and internet browsing capabilities. Despite these advances in mobile technology, service providers for mobile devices typically place limitations on data connections that are more restrictive than connections from workstation computers. For example, wireless providers terminate or drop inactive data connections between mobile devices and servers upon the expiration of a fixed 'time out' period. Given the increasing versatility of mobile devices, it is helpful to implement a means by which these mobile devices can maintain active connections with servers during periods of inactivity on the mobile devices.

As wireless data networks mature and evolve, mobile devices are moving from having occasional data coverage to having near-constant data network connectivity. As a function of increasing wireless network data coverage and bandwidth, applications running on mobile client devices increasingly rely upon web server and enterprise server data provided in response to Hypertext Transfer Protocol (HTTP) requests. Current techniques for establishing data connections between mobile devices and servers such as web servers and enterprise servers often result in connections which are dropped by wireless service providers before HTTP requests are fulfilled. For example, if a mobile device submits an HTTP request to a web server that takes five minutes to fulfill and the service provider for the mobile device data connection drops inactive connections after 3 minutes, the mobile device's data connection will be terminated before the HTTP request is fulfilled. Given the bandwidth limitations enforced by wireless providers, it is difficult for web servers to serve HTTP responses in request to HTTP requests from mobile devices. As mobile devices run a variety of operating systems, software suites, and internet browser applications, methods for maintaining data connections need to be platform independent.

Some current network connection limitations enforced by wireless service providers require that a connection between a mobile device and a server remain 'active' in order to avoid termination. Current techniques for connection management often fail to distinguish an 'inactive' connection from a connection that is awaiting an HTTP response to be fulfilled by a server in response to an HTTP request. For example, a timeout may occur while a mobile device is awaiting large amounts of data in a HTTP response to be sent from a web server. The data to be processed by a web server may include HyperText Markup Language (HTML) documents and linked objects such as scripts, audiovisual files (i.e., sound and image data).

Due to the fact that mobile devices are typically remote from the web servers and enterprise servers they submit HTTP requests to, data may be staged on a third server that mobile devices, the web servers, and the enterprise servers can readily access. Data sent from enterprise servers to roaming mobile devices is often inspected by a firewall server. In order to facilitate data security, firewall servers, like wireless service providers, often drop connections after a predetermined time period of inactivity.

In sum, current mobile data delivery techniques often result in response times that exceed wireless service provider and firewall timeout parameters, which results in connections that are terminated before data requests from a mobile device can be fulfilled.

Accordingly, what is desired is a means of letting mobile client devices and servers know that a connection is still active. What is further is desired are methods, systems, and computer program products for maintaining connections (i.e., keeping connections alive) between mobile devices and firewall servers without requiring user activity.

What is also desired is a means of efficiently and reliably maintaining data connections (i.e., keeping data connections alive) between mobile devices and enterprise servers without requiring user activity on the mobile devices. What is further desired are methods, systems, and computer program products that keep data connections between mobile devices and web servers from being terminated without requiring mobile device activity while HTTP requests are fulfilled.

SUMMARY OF THE INVENTION

The invention includes methods, systems, and computer program products for maintaining data connections between mobile client devices and servers. In an embodiment of the invention, the servers are web servers that serve HTTP requests. The invention also includes methods, systems, and computer program products that allow users to set and update connection settings that determine how often an HTTP 'keep-alive' request is sent from a mobile device to a server. The HTTP keep-alive requests serve the purpose of informing a mobile client and a server that a connection between the mobile client and the server is still active. In an embodiment, the HTTP keep-alive requests include information sent in HTTP request-header fields.

The methods, systems, and computer program products use HTTP request-header and response-header fields to send data back and forth between client and server. These HTTP responses and requests may be conceptualized as 'dummy responses' and 'dummy requests' which are sent at dynamic time intervals in order to keep wireless providers and firewall servers from dropping connections. For example, in order to ensure that a connection from the device to the server is up to date and remains valid, the device may perform a keep-alive request at the HTTP level. In an embodiment, the client makes a request of the server and specifies a timeout for a server and the client waits for a corresponding response from the server. If the request times out prior to the response being ready, the server will respond with an HTTP message that indicates the request timed out. The mobile device will then post to the server with an empty HTTP request. The server associates this empty HTTP request with the old request and starts the whole process over. In this way, the subsequent HTTP request is associated with the first HTTP request and the connection is kept alive.

In accordance with an embodiment of the invention, the method prevents a connection between a mobile device and a web server from being dropped by a service provider by sending HTTP requests from the mobile device to the server at dynamic time intervals and associating subsequent HTTP requests with prior HTTP requests. Similarly, the method also prevents a connection between a mobile device and a firewall server from being dropped by the firewall server by sending HTTP requests from the mobile device to the server at dynamic time intervals, wherein subsequent HTTP requests are associated with previously-sent HTTP requests. Unlike other protocols that may be used to submit data requests which can not be passed by firewalls, such as the Transmission Control Protocol (TCP) and the User Datagram Protocol (UDP), an embodiment uses HTTP level requests and responses that can be passed by firewalls, thereby preventing a connection between a mobile device and a firewall from being terminated.

The invention also includes a computer program product comprising a computer usable medium having computer program logic recorded thereon for enabling a processor to maintain a connection between a mobile device and a server.

The invention additionally includes a system capable of synchronizing data objects such as email messages, applications, and calendar entries between a plurality of mobile devices and a plurality of servers. The system includes a listening module configured to determine whether there is a data object to synchronize from a source mobile device to a destination server, a flagging module configured to notify the destination server that there is a data object to be synchronized, a caching module configured to cache the data object to be synchronized on the destination server, a determining module configured to determine whether the source mobile device is online, a queuing module configured to queue data synchronization until the mobile device is online, and a synchronization module configured to synchronize the data object on the destination server and to return results to the source mobile device. In accordance with an embodiment, the system also synchronizes data objects from a source server such as an email or enterprise server to a destination mobile device through use of a listening module on the server configured to determine whether there is a data object to synchronize from the server to a destination mobile device, a flagging module configured to notify the destination mobile device that there is a data object to be synchronized, a caching module configured to cache the data object to be synchronized on the mobile device, a determining module configured to determine whether the source mobile device is online, a queuing module configured to queue data synchronization until the mobile device is online, and a synchronization module configured to synchronize the data object on the destination mobile device and to return results to the source server.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the relevant art to make and use the invention.

Figure 1:
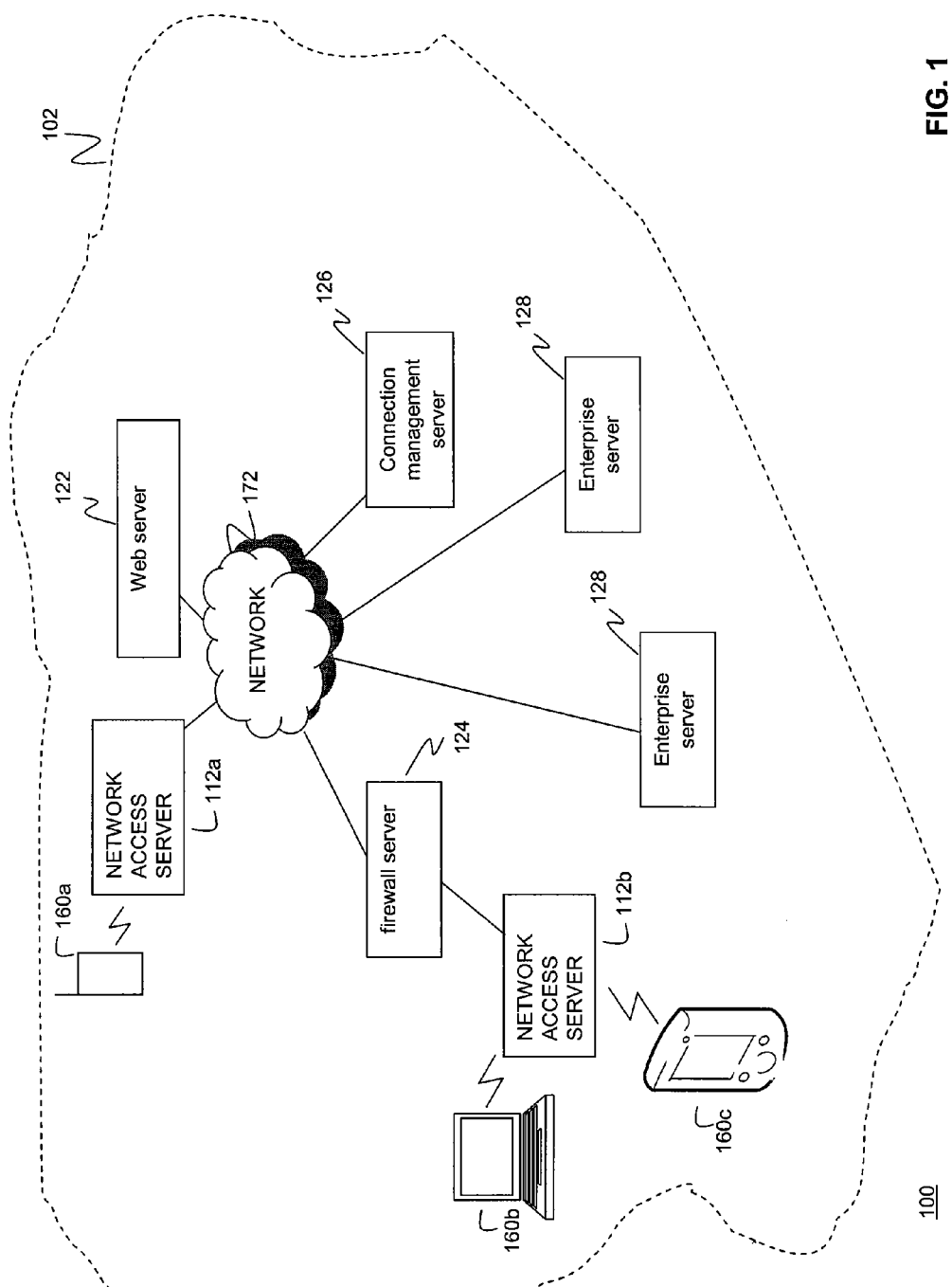
FIG. 1 depicts a mobile data environment, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The present invention relates to systems, methods, and computer program products for maintaining connections between mobile client devices and back end servers such as web servers, firewall servers, and enterprise servers.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The detailed description of embodiments of the present invention is divided into several sections. The first section provides definitions of terms used to describe embodiments of the invention.

DEFINITIONS

As used herein, in an embodiment, the term connection refers to any communications network link between a client and a server. A connection may be comprised of a concatenation of multiple wireless and/or wireline network links. As would be recognized by persons of skill in the art, embodiments of the present invention can be used in any type of communications network (e.g., wireless, wireline, or hybrid networks). For example; a mobile client device may communicate with a web server or firewall server via a connection comprising one or more wireless links using wireless data communications protocols. A wireless connection from a mobile client device to a server are typically subject to limits imposed by a wireless service provider.

As used herein, in an embodiment, the term "server" encompasses computing devices that are designed to function as one or more of connection maintenance servers, web servers, firewall servers, and enterprise servers such as email servers, file servers, application servers, and other back end servers. A server may be comprised of one or more server machines. A server may be implemented as collection of servers such as a server farm or server cluster. For example, web servers may be commercially available server machines with one or more central processing units (CPUs). Alternatively, these web servers may comprise multiple computing devices and/or computing functionality hosted on multiple server machines (i.e., a server farm).

In an embodiment, an email server refers to an enterprise server such as a back-end server-side personal information manager (PIM) provider. In accordance with an embodiment of the invention, the PIM provider may be one of many applications commonly designated enterprise email applications, such as, but not limited to, Microsoft Exchange, Lotus Domino, and Novell GroupWise.

As used herein, in an embodiment, a mobile device may be any wireless mobile computing or communication device such as a mobile phone, a personal digital assistant (PDA), a smart phone, a hand held computer, a palmtop computer, an ultra-mobile PC, a device operating according to the Microsoft Pocket PC specification with the Microsoft Windows® CE operating system (OS), a device running the Symbian OS, a device running the Windows Mobile® Standard OS, a device running the Windows Mobile® Professional OS, a device running the Palm OS®, a Blackberry® device, a Treo®, or an iPhone®. Mobile device connection maintenance software may be downloaded from a remote web server and installed through an installation routine or installed in response to a Short Message Service (SMS) message and hyperlink sent to the mobile device. Alternatively, a version of the mobile device connection maintenance software corresponding to a specific mobile device (i.e., make, model, operating system, and browser) may be pushed to the mobile device from a download server based on mobile device information contained within HTTP header data in an HTTP request sent from the mobile device.

Unless specifically stated differently, in an embodiment, a user is interchangeably used herein to identify a human user, a software agent, or a group of users and/or software agents. Besides a human user who needs to synchronize email, data, and calendar entries, a software application or agent sometimes needs to synchronize these items. Accordingly, unless specifically stated, the term "user" as used herein does not necessarily pertain to a human being. A user may be a subscriber to a wireless service.

According to embodiments of the invention, connections between mobile client devices are maintained by exchanging HTTP requests and responses between servers and mobile devices.

The next section describes a system for maintaining connections between mobile client devices and servers such as web servers and firewall servers used to access enterprise servers. Enterprise servers include, but are not limited to, email servers, database servers, file servers, and application servers. Subsequent sections describe methods and systems for preventing connections between servers and mobile devices from being dropped by wireless service providers.

Mobile Environment

FIG. 1 depicts a mobile environment 100, which allows mobile devices 160a-c to connect to web server 122 over the Internet 102, in accordance with an embodiment of the present invention. While this embodiment is described chiefly in terms of a connection between mobile devices 160a-c and web server 122, it is applicable to other servers such as enterprise servers 128. Mobile devices 160a-c may connect to enterprise servers 128 via one or more firewall servers 124. As described above, enterprise servers 128 may be email servers, database servers, file servers, application servers, and/or other back end servers. One skilled in the relevant arts will appreciate that any network, such as a corporate intranet, may be used instead of the Internet 102. Connection management server 126 maintains a connection between mobile devices 160a-c and web server 122 via network 172.

Mobile devices 160a-c may be one of many devices commonly designated as mobile clients, such as, but not limited to, personal digital assistants ("PDAs"), devices operating according to the Microsoft Pocket PC specification with the Microsoft Windows® CE operating system (OS), devices running the Windows Mobile® Standard and Professional Operating Systems, devices running the Symbian OS, devices running the Palm OS® mobile phones, BlackBerry® devices, smart phones, hand held computers, palmtop computers, laptop computers, ultra-mobile PCs, and other wireless mobile devices capable of running mobile browsers and other mobile applications.

Mobile device 160a accesses network 172 via network access server 112a in order to send HTTP requests to and receive HTTP responses from web server 122. Mobile devices 160b and 160c access network 172 via network access server 112b in order to send data requests to and receive data from enterprise servers 128 via firewall server 124. Network access servers 112a-b are configured by one or more wireless service providers. One skilled in the relevant arts will appreciate that wireless service providers often configure network access servers 112a-b to control connections to network 172. Wireless service providers employ techniques to manage bandwidth consumption for their wireless networks. One of these techniques is the termination of wireless data connections that remain inactive for predetermined time periods. For example, a wireless service provider may terminate or drop a connection between mobile device 160a and web server 122 via network 172 if the connection is inactive for five minutes or some other time threshold.

In an embodiment of the invention, connection management server 126 prevents connections between mobile devices 160a-c and web server 122 from being dropped by a wireless service provider by sending HTTP 'keep-alive' messages to web server 122 via network 172.

In order to control access to data residing on enterprise servers 128, firewall server 124 may be configured to drop a connection between a mobile device 160 and enterprise server 128 via network 172 if the connection is inactive for a predetermined amount of time. For example, firewall server 124 may be configured to close connections to a mobile device 160 that has not sent any requests for five minutes in order to provide data security for data resident on an enterprise server 128.

According to an embodiment of the present invention, connection management server 126 prevents connections between mobile devices 160a-c and enterprise servers 128 from being dropped by firewall server 124 by periodically sending HTTP 'keep-alive' messages to firewall server 124 via network 172, thereby keeping the connections in an active state.

According to an embodiment of the present invention, HTTP keep-alive messages ensure that a connection from mobile device 160a to web server 122 are up to date and remain valid. This is achieved by configuring connection management server 126 to send a keep-alive messages on behalf of mobile device 160a at the HTTP level. For example, mobile device 160a makes an HTTP request of web server 122 and specifies a timeout period. Web server 122 will respond with a HTTP response. If the HTTP request times out prior to the HTTP response being ready, web server 122 will respond with an HTTP message that indicates the HTTP request timed out. Instead of inactivity causing a wireless service provider to drop the connection used by mobile device 160a, connection management server 126 will then post to web server 122 with an empty HTTP request. The server associates this empty HTTP request with the old request and repeats the process. In this way, the subsequent HTTP request is associated with the first HTTP request and the connection used by mobile device 160a is maintained (i.e., kept alive).

Mobile environment 100 is commonly a persistent network connection over a cellular provider network, and communications travel over the Internet 102. However, mobile environment 100 may be any communication means by which web server 122, connection management server 126, and mobile devices 160a-c may interact, such as a docking cradle, Wide Area Network (WAN), Local Area Network (LAN), Wireless Local Area Network (WLAN), infrared, or Bluetooth. The degree of availability of access to the communication means employed may vary greatly, and users of mobile devices 160a-c may go for days without connection to web server 122 or connection management server 126, or may be able to communicate constantly when connected to a WAN.

In a typical mobile environment such as mobile environment 100, multiple mobile devices 160a-c may connect to web server 122 via network 172. Similarly, multiple mobile devices 160a-c may connect to enterprise servers 128 via firewall server 124. As discussed above, web server 122, firewall server 124, and connection management server 126 need not be a single physical computer, and may in fact comprise several computers distributed over a number of physical and network locations. For the purposes of illustration, web server 122 and firewall server 124 are depicted as single points of access in mobile environment 100. Web server 122 and connection management server 126 need not be separate physical computers either, and may in fact comprise a single computer as the functionality of connection management server 126 may be performed by a virtual machine running on web server 122. Similarly, the functionality of connection management server 126 may be performed by a virtual machine executing on firewall server 124. Conversely, the functionality of firewall server 124 may be performed by a software application or virtual machine executing on connection management server 126.

Connection Maintenance Systems

Figure 2:
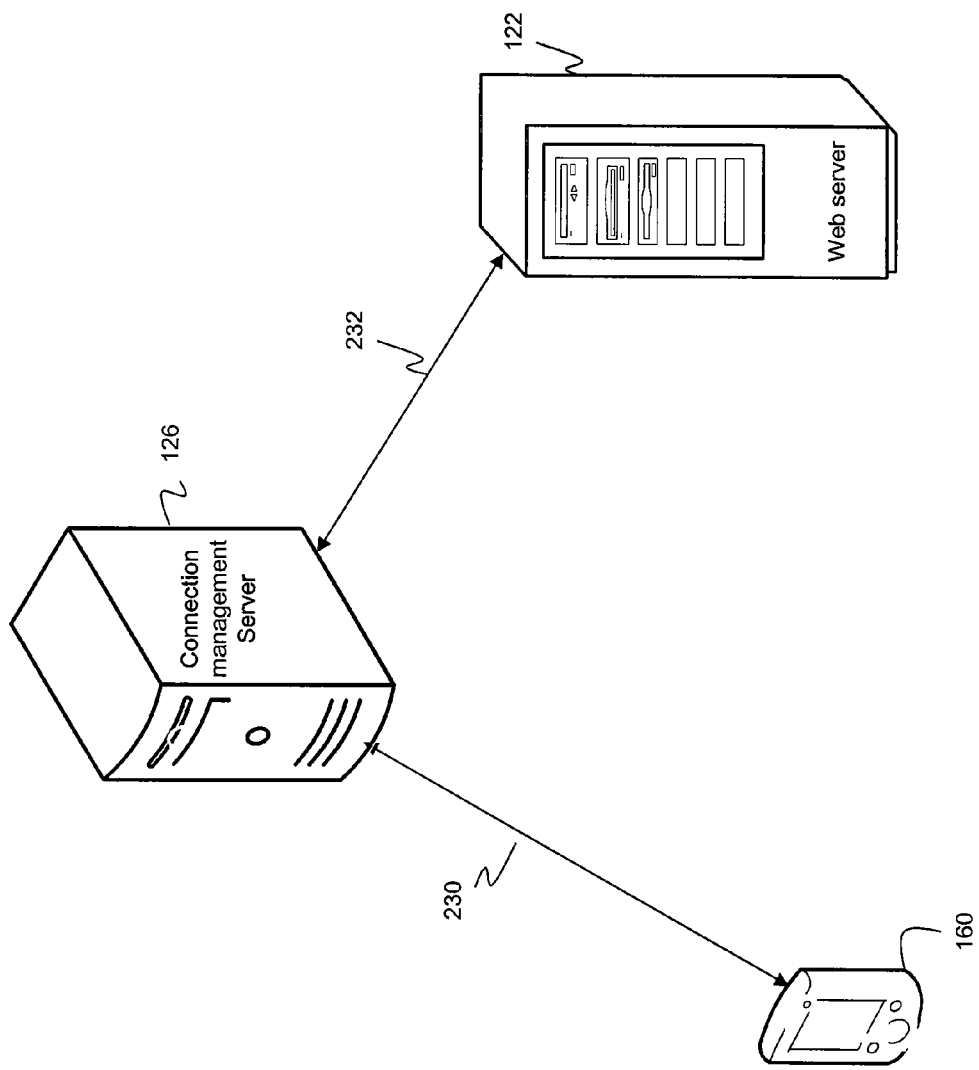
FIG. 2 illustrates a modular view of a mobile data communications system, in accordance with an embodiment of the present invention.

FIG. 2 depicts connection maintenance system 200 in which connection management server 126 is capable of maintaining an active connection between mobile device 160 and web server 122 via connection 230. In accordance with an embodiment of the present invention, mobile device 160 forwards HTTP requests to connection management server 126 via connection 230. In an embodiment, completed HTTP responses received from web server 122 via connection 232 are forwarded to mobile device 160 via connection 230 by connection management server 126. In an embodiment, connection maintenance system 200 is operable to keep connection 232 to web server 122 from being dropped (i.e., by the wireless service provider used by mobile device 160) by using http headers to send data back and forth between mobile device 160 and web server 122 at dynamic intervals. These http headers may be sent as 'dummy requests' and 'dummy responses' which serve the purpose of keeping connections 230 and 232 active, thereby preventing a wireless service provider from terminating the connections due to inactivity.

Figure 3:
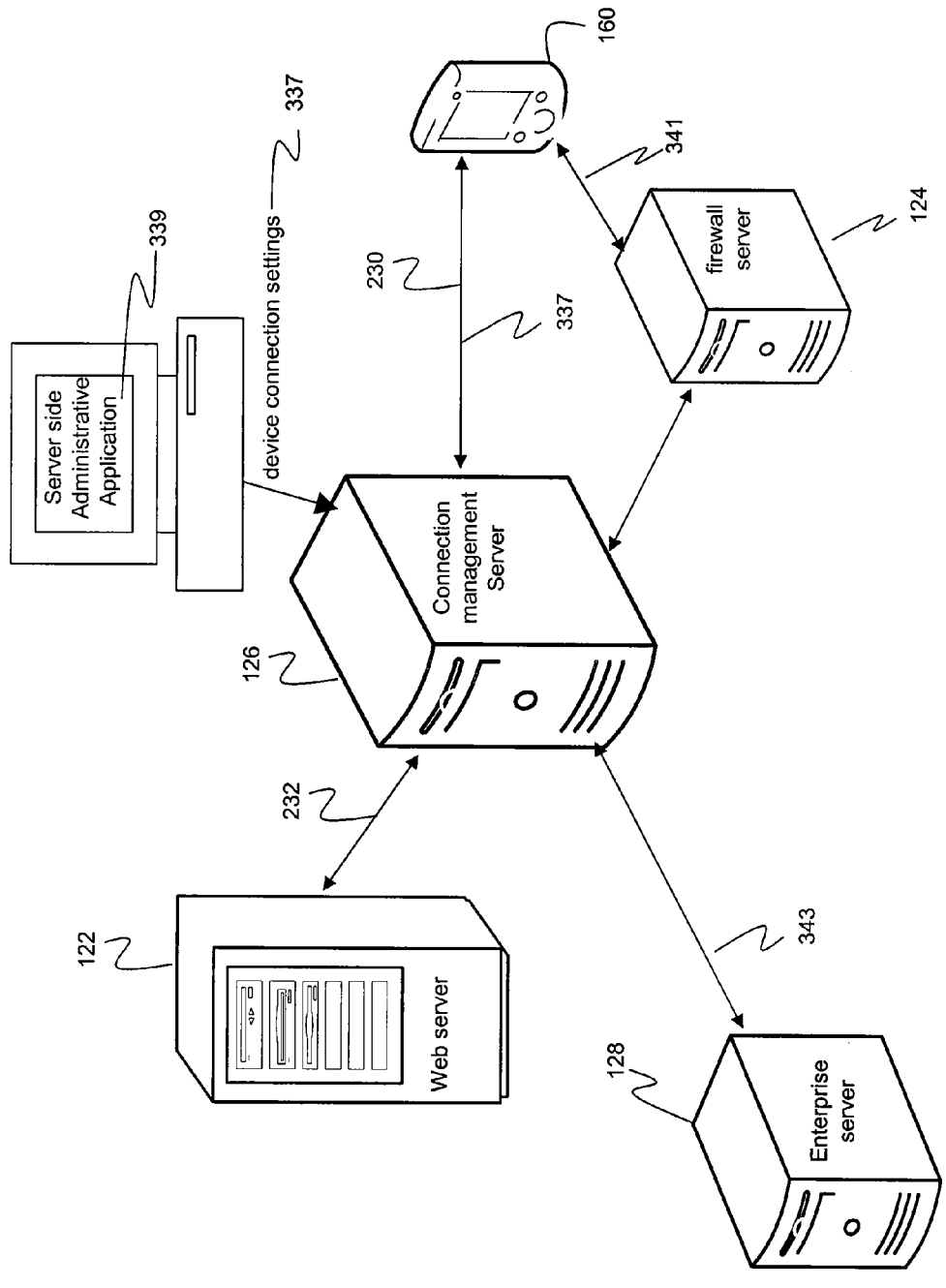
FIG. 3 illustrates a modular view of a mobile data communications system wherein a mobile device connects to a web server and an enterprise server via a connection management server, in accordance with an embodiment of the present invention.

FIG. 3 depicts the components of connection maintenance system 300, according to an embodiment. Connection maintenance system 300 includes a server side administrative application 339 used to edit and forward connection settings 337 associated with mobile device 160 to connection management server 126, in accordance with an embodiment of the present invention.

Server side administrative application 339 may be used to set and change a time interval for sending HTTP keep-alive requests to web server 122 and firewall server 124. For example, server side administrative application 339 may be used to set a keep-alive interval in seconds (See FIGS. 9 and 10). Server side administrative application 339 then forwards the keep-alive interval to connection management server. In the exemplary embodiment depicted in FIG. 3, server side administrative application 339 is remote from connection management server 126. In an alternative embodiment, server side administrative application 339 may be implemented as an application residing on connection management server 126. In another embodiment, connection settings 337 may be edited on mobile device 160 using an interface on mobile device 160 (See FIGS. 12 and 13) and forwarded to connection management server 126 via connection 230.

In the connection maintenance process performed by connection maintenance system 300, connection management server 126 handles the maintenance of connections 230 and 232 between mobile device 160 and web server 122. Connection management server 126 also maintains connection 341 between mobile device 160 and firewall server 124.

In an embodiment, connection management server 126 uses received connection settings 337 to determine how often HTTP requests are sent to web server 122 and firewall server 124 in order to keep connections 230, 232, and 341 active.

In accordance with an embodiment of the invention, data is passed along connection 232 as HTTP header fields in HTTP requests sent to web server 122 or firewall server 124. In an embodiment, a dummy request from mobile device 160 to web server 122 sent via connection 232 is created using the GetHttpChunkTerminator function provided below. In another embodiment, data is passed along connection 341 as HTTP requests containing HTTP header fields in sent to firewall server 124. The purpose of both types of HTTP requests is similar, i.e., to keep the respective connections from mobile device 160 to web server 122 and firewall server 124 from being dropped due to inactivity. In accordance with an embodiment, the GetHttpChunkTerminator function is used to send a 're post' (i.e., a follow up HTTP request) to connection management server 126 after a timeout has occurred (i.e., after a keep alive interval has passed). The GetHttpChunkTerminator function is called in order to keep the connection 230 alive because as connection 230 will dropped by a wireless service provider if there is no traffic (i.e., no activity) transmitted over connection 230 for a certain amount of time. The re post generated by the GetHttpChunkTerminator function is HTTP compliant. Although the exemplary implementation of the GetHttpChunkTerminator function is implemented using the C programming language, after reading this description, it will become apparent to a person skilled in the relevant art how to implement the function using other computer programming languages.

```
/***********************************
* Name    : GetHttpChunkTerminator
* Desc    : Send a Post (Any post) to the server. The server timed out
           the previous Post and a post must be sent in order to keep
           the connection alive because the TCP connection is dropped
           if there is no traffic on the data link for too long. This repost
           is HTTP compliant
***********************/
STINT32 RePost( HTTPC_CTX *pHttpcCtx )
{
    STINT32 lRetval = eCMErr_Success;
    _STLOG( ( LOG_HTTP, _T("RePost\n") ) );
    lRetval = HTTP_TPSendRequest( pHttpcCtx,
pHttpcCtx->pszEncodedDestURL, NULL, 0 ); #ifdef _WIN32_WCE
    // If enabled, sends message to OBMon
    NotifyOBMon( OBMON_MSG_PING_SENT, 0 );
#endif // _WIN32_WCE
    return lRetval;
}
```

In an embodiment, an exemplary HTTP header format that includes the time that mobile device 160 expects a dummy HTTP response from connection management server 126 (or a real HTTP response from web server 122 or firewall server 124) is provided in the code segment below. In this embodiment, the KeepAlive value may be an American Standard Code for Information Interchange (ASCII) representation of a decimal number in seconds that mobile device 160 expects connection management server 126 to send back an empty HTTP response after the request associated with an HTTP request header is sent from mobile device 160 (assuming that the actual HTTP response from web server 122 or firewall server 124 is not yet ready). The empty HTTP response can be conceptualized as a 'dummy' response that serves the purpose of keeping connection 220 from being dropped due to inactivity. In an embodiment, the empty HTTP response is generated by the GetHttpChunkTerminator function described above.

```
const TCHAR *pszHttpHeader=_T("POST %s HTTP/1.1\r\nhost:%s\r\n%sIAS-RS-App-Timeout-Minute: %ld\r\nUser-Agent: MobileOffice\r\nKeepAlive: %ld\r\nTransfer-Encoding:chunked\r\n\r\n%s");
```

In an embodiment of the invention, a SendKeepAliveResponse function used by connection management server 126 to send a dummy response to mobile device 160 via connection 230 is provided in the code segment below. According to an embodiment, the SendKeepAliveResponse function generates an HTTP response which contains HTTP header information indicating that a server such as web server 122 has responded with a timeout. While the exemplary implementation of the SendKeepAliveResponse function is implemented using the C programming language, after reading this description, it will become apparent to a person skilled in the relevant art how to implement the function using other computer programming languages.

```
/******************************
* Name     : SendKeepAliveResponse
* Input    : HttpSession - Session info
* Output   :
* Return Val : ERR_Success if successfully sent, error code otherwise
* Desc     : Sends a minimal HTTP response back to the client
***********************************************/
ETINT32 CBaseHTTPServer::SendKeepAliveResponse(
HttpSessionInfo& HttpSession )
{
    ECString csData;
    ECCharString cssData;
    csData.Format( _T("HTTP/1.1 200 Success\r\nServer: %s\r\nX-ObError: Timeout\r\ntransfer-encoding: chunked\r\n\r\n0\r\n\r\n"),
    OEM_SHORT_PRODUCT_NAME );
    csData.GetMBString( cssData );
    // Using temp BA to allow for null terminator added by EStrwcstombs.
Will then copy to byte array
    ECByteArray baTemp;
    baTemp.InsertAt(0,(ETUINT8*)(const ETINT8 *)cssData.GetString( ),
    cssData.GetLength( ));
    ETINT32 iRet = _send( HttpSession, baTemp );
    if ( iRet != cssData.GetLength( ) )
        iRet = ERR_Fail;
    else
        iRet = RETCODE_Success;
    return iRet;
}
```

In an embodiment, program logic used by mobile device 160 to read a dummy response received from connection management server 126 via connection 230 is provided in the code segment below. In an embodiment, the empty HTTP response is generated by the SendKeepAliveResponse function described above. According to an embodiment, after connection management server 126 sends a dummy or empty HTTP response indicating that a timeout has occurred, the code segment below executes on mobile device 160 in order to read an empty HTTP post from connection management server 126 which contains HTTP header information indicating that a server such as web server 122 has responded with a timeout.

```
if ( pcHeaderError && ( 0 == strcmp( HTTP_HEADER_ERROR_TIMEOUT, pcHeaderError ))
)
        {
            _STLOG( ( LOG_HTTP, _T("GetHttpHeader -- HTTP Header Error=TimeOut\n") ) );
            // the server responded with a timeout - receive the rest of the message and then send a
POST
            pHttpcCtx->eHttpState = ehttpGettingChunkSizeLineTimeOut;
#ifdef _WIN32_WCE
            // If enabled, sends message to OBMon
            NotifyOBMon( OBMON_MSG_PING_RECEIVED, 0 );
#endif // _WIN32_WCE
        }
        else
        {
            // We got the http header. Now start looking for the chunk size line.
            pHttpcCtx->eHttpState = ehttpGettingChunkSizeLine;
        }
        // Calculate the header size
        nHdrSize = (STUINT8*)pHdrEnd - pHttpcCtx->pChunkBufReadPos +
HTTP_HEADER_TERMINATOR_LENGTH;
        // parse the header for http error code.
        // make an attempt to look at the headers and make sure the response is ok and chunked.
        // move the rest of the avilable bytes to the begining of the buffer.
        AdjustChunkBuf( pHttpcCtx, nHdrSize );
    }
}
```

```
        //it is possible that the nBytesInCheckBuf is larger than
HTTP_HEADER_TERMINATOR_LENGTH,
        //but still not receive the HTTP header terminator. In this case, it should continue to
        //read the following data instead of returning an error. An error should be returned only
        //if the whole chunk buffer (512 bytes) has been read but still unable to find the Http header
        //terminator, since this only happens if the previous request was not canceled by the
        //application before sending the new request. The app should prevent it from happening by
        //calling CancelRequest when aborting a pending request.
        else if ( pHttpcCtx->nBytesInChunkBuf >= HTTP_DEFAULT_CHUNKSIZE )
        {
            // HTTP_HEADER_END is not found. Return error.
            nRetval = eCMErr_InvalidCmd;
            pHttpcCtx->eHttpState = ehttpError;
            _STASSERT(0);              // Invalid state.
        }
    }
    return nRetval;
}
```

According to an embodiment of the present invention, a ReadKeepAliveRequest function used by connection management server 126 to read a dummy request from mobile device 160 is provided in the code segment below. The dummy request may be implemented as an HTTP request re post that contains a valid HTTP post with no data and an indication of a timeout threshold (i.e., keep alive period). In an embodiment, connection management server 126 calls the ReadKeepAliveRequest function in order to parse the keep alive timeout value from the HTTP header of the dummy request. Invoking the ReadKeepAliveRequest function serves the purpose of keeping data flowing on connection 230 between mobile device 160 and connection management server 126 from being terminated due to inactivity. Once read by the connection management server 126, the dummy request may be passed along to web server 122 via connection 232 in order to keep connections 230 and 232 active. Alternatively, the dummy request may be passed along to firewall server 124 via connection 341. Although the exemplary implementation of the ReadKeepAliveRequest function is implemented using the C programming language, after reading this description, it will become apparent to a person skilled in the relevant art how to implement the function using other computer programming languages.

```
/*********************************************
* Name     : ReadKeepAliveRequest
* Input    : Socket - Socket client is connected on
*          : ConnReadWriteParams - Connection info
* Output   :
* Return Val : ERR_Success if read, ERR_Fail if socket closed
* Desc     : Reads "dummy" client request and parses keep alive timeout
*********************************************/
ETINT32 CBaseTCPServer::ReadKeepAliveRequest( const SOCKET &Socket,
ECConnReadWriteParams* pConnReadWriteParams )
{
    ETINT32 iRetVal = RETCODE_Success;
    ECByteArray baData;
    ECString csData;
    ECCharString cssData;
    ETBOOLEAN bDone = EVFALSE;
    ECString csOldData;
    _ASSERT( pConnReadWriteParams != NULL );
    ECString csLogStr;
    csLogStr.Format(_T("Inside ReadKeepAliveRequest, socket = %ld"), Socket);
    AddToMessageLog((const TCHAR*)csLogStr);
    while ( !bDone && iRetVal == RETCODE_Success )
    {
        ECArray<SOCKET> ReadSockets(1, &Socket);
        ETINT32 ReadyCount = ESelect( &ReadSockets, NULL, NULL,
KEEP_ALIVE_SELECT_TIMEOUT );
        if ( ReadSockets.GetLength( ) > 0 )
        {
            iRetVal = _recv( Socket, baData );
            if ( iRetVal == ERR_Success )
            {
                ETINT32 iLen = baData.GetLength( );
                baData.SetLength( iLen + 1 );
                baData[ iLen ] = '\0';
                cssData = reinterpret_cast<const ETINT8 *>( baData.GetRawBufferPtr( ) );
                cssData.GetTString( csData );
                csData.Insert( 0, csOldData.GetString( ) );
                csLogStr.Format(_T("Parsing in ReadKeepAliveRequest, socket = %ld, csData = %s"),
Socket, csData.GetString( ) );
                AddToMessageLog((const TCHAR*)csLogStr);
                ETINT32 iIndex = csData.Find( _T("0\r\n\r\n") );
```

```
        if ( iIndex >= 0 )
        {
          bDone = EVTRUE;
          csData.MakeLower( );
          iIndex = csData.Find( KEEP_ALIVE_HEADER, 0 );
          if ( iIndex >= 0 )
          {
            //Add 1 for the ':', if we go too far we just get 0, which is ok
            csData.LTrimChars( iIndex + _tcslen( KEEP_ALIVE_HEADER ) + 1);
            if ( csData.GetLength( ) > 0 )
            {
              csData.Scanf( _T("%d"), &pConnReadWriteParams->m_iKeepAliveTimeout );
            }
          }
        }
        csOldData = csData;
      }
    }
    else
    {
      // We can't block this routine (at least not forever), or we won't be able to receive
      // messages on any sockets anymore. If the client started sending the keepalive but
      // didn't complete it within 30 seconds then bail on it
      iRetVal = ERR_Fail;
    }
  }
  if( iRetVal != RETCODE_Success)
    iRetVal = ERR_Fail;
  csLogStr.Format(_T("Leaving ReadKeepAliveRequest, socket = %ld, retval = %d"), Socket,
iRetVal );
  AddToMessageLog((const TCHAR*)csLogStr);
  return iRetVal;
}
```

Connection Maintenance Methods

FIGS. 4-8 are message sequence charts depicting the sequence and associated operation that occurs when HTTP requests and responses are sent between a mobile device and a server, in accordance with an embodiment of the invention. FIGS. 4-9 are described with continued reference to the embodiments illustrated in FIGS. 1-3. However, FIGS. 4-9 are not limited to those embodiments.

Figure 4:
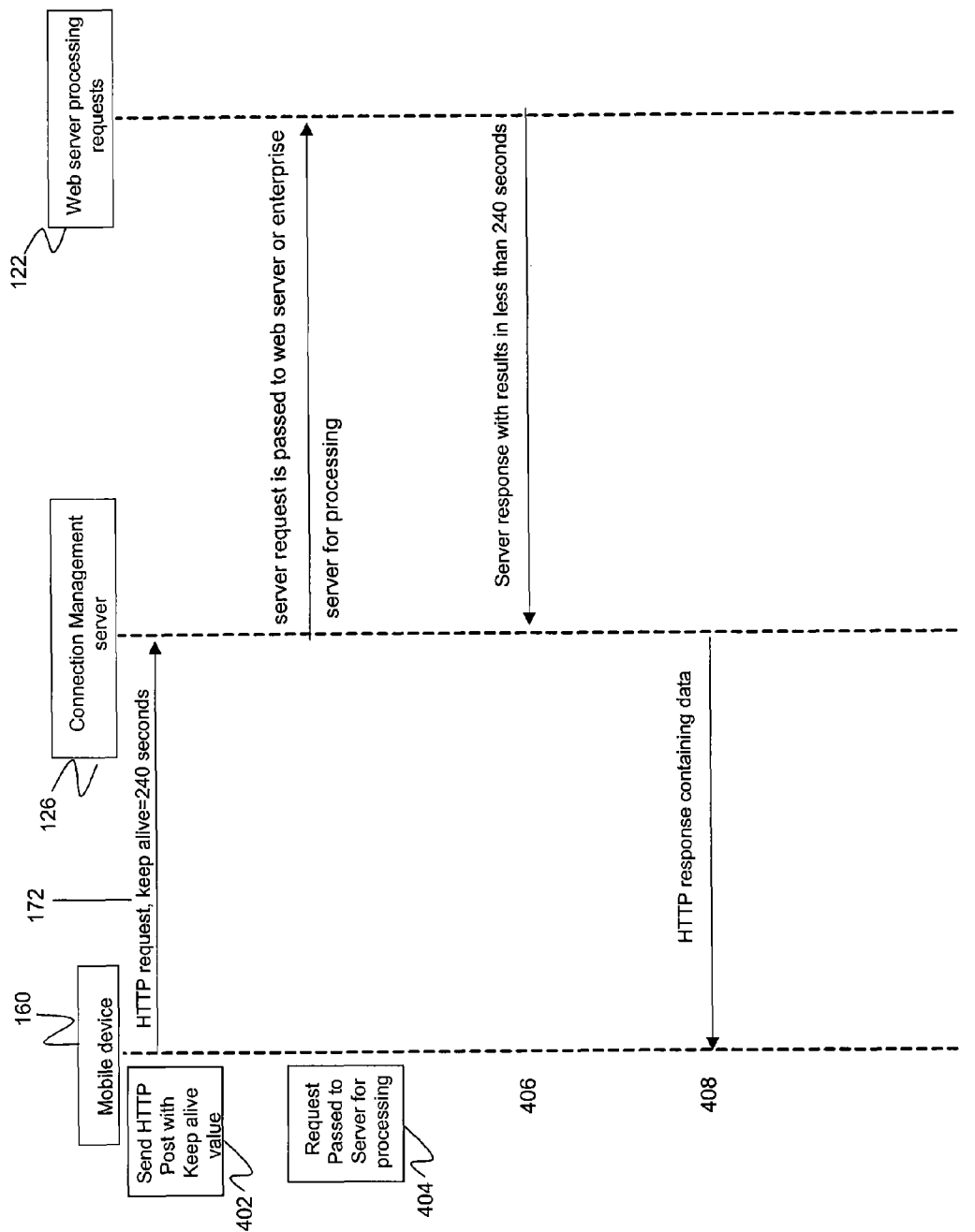
FIGS. 4-8 provide Message Sequence Charts illustrating operational steps by which a connection between a mobile device and server is maintained, in accordance with embodiments of the present invention.

FIG. 4 illustrates the calling sequence 400 for a scenario where a mobile device 160 receives an HTTP response from web server 122 or firewall server 124 via network 172 within a predetermined timeout period. In sequence 400, mobile device 160 receives an HTTP response containing data and an HTTP keep-alive message is not used.

In step 402, an HTTP post containing a server request and a keep alive value of 240 seconds is sent from mobile device 160 to connection management server 126. In the example embodiment depicted in FIG. 4, a keep alive value of 240 seconds is depicted. However, the keep alive value is one of the connection settings 337 which can be changed using server side administrative application 339 (See FIGS. 10 and 11). Connection settings 337, including but not limited to the keep alive value, can also be set using an interface on mobile device 160 (See FIG. 13).

In step 404, the HTTP request is passed from connection management server 126 to the actual server that will process the request. Depending on the type of request, either a web server 122 or enterprise server 128 may process the request. In the case of an enterprise server 128, the HTTP request may be routed via a firewall server 124 in this step in order to provide enhanced security for corporate or organizational data residing on enterprise server 128. This step may entail sending the request via connections 232 or 341 shown in FIG. 3.

In step 406, the server (either web server 122 or enterprise server 128) responds to the HTTP request sent in step 402. In this step, the HTTP response is sent to connection management server within the timeout indicated as the keep alive value sent in step 402 (i.e., within 240 seconds). As the HTTP response sent in step 406 contains results requested in step 402, it is not a 'dummy' response.

In step 408, the HTTP response containing results is sent from connection management server to mobile device 160. This step may entail sending the response via connection 230 illustrated in FIGS. 2 and 3. Once the response is received by mobile device 160, sequence 400 ends.

Figure 5:
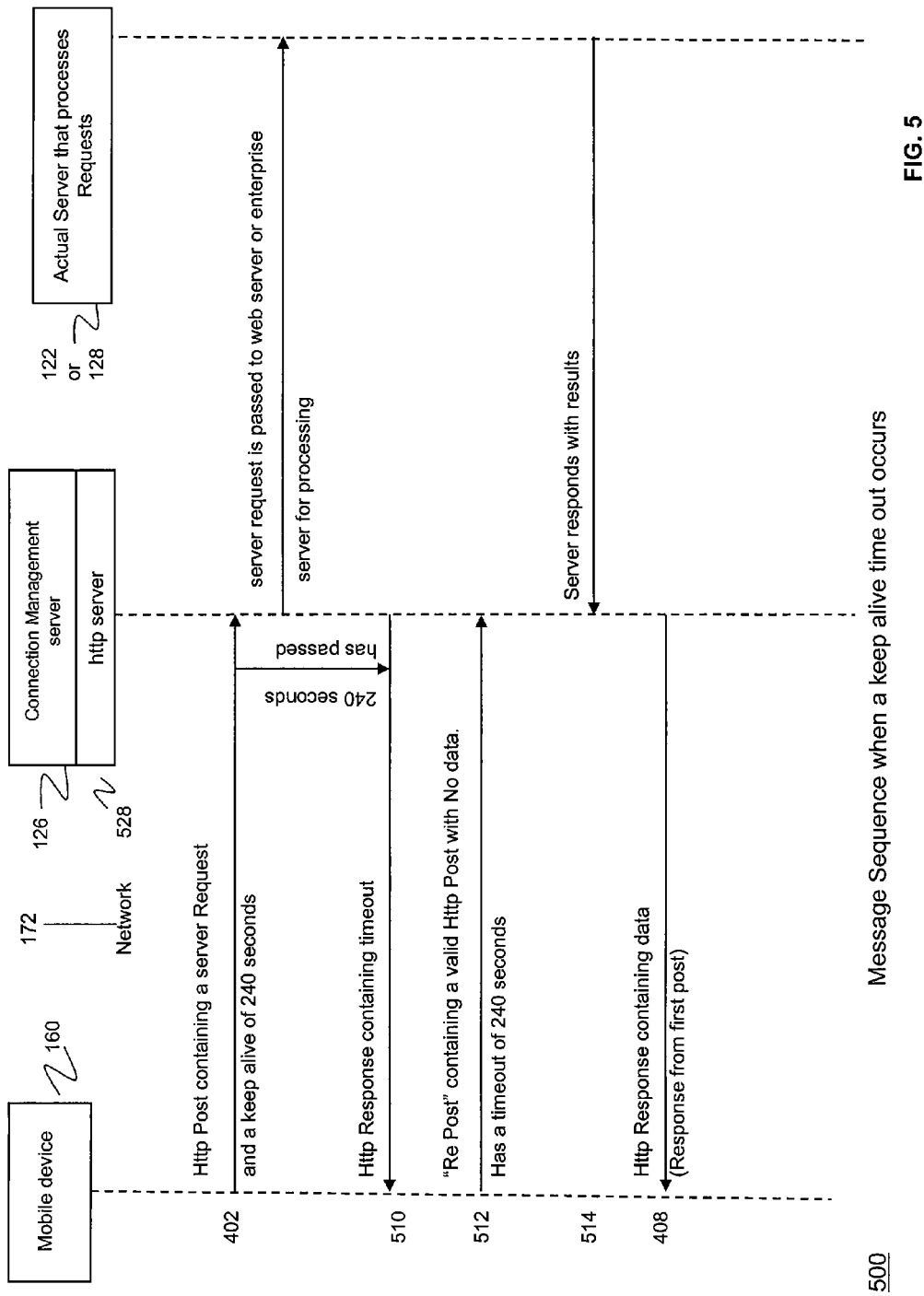

FIG. 5 is a message sequence chart depicting a method 500 for maintaining a connection between a mobile device and a server when the mobile device does not receive a response from a server within a predetermined timeout period.

FIG. 5 is described with continued reference to the embodiments illustrated in FIGS. 1-4. However, FIG. 5 is not limited to those embodiments.

Method 500 handles cases where an HTTP response from web server 122 or enterprise server 128 via network 172 is not received by mobile device 160 within a predetermined timeout period. While this embodiment is described primarily in terms of a connection between a mobile device 160 and web server 122, it is applicable to other servers that process requests from a mobile device 160 such as enterprise servers 128. As depicted in FIG. 5, a 'dummy' HTTP request with no data is sent from mobile device 160 in order to keep a connection to web server 122 or firewall server 124 alive.

Method 500 begins in step 402 when an HTTP post containing a server request and a keep alive value of 240 seconds is sent from mobile device 160 to connection management server 126. In the example embodiment depicted in FIG. 5, a keep alive value of 240 seconds is depicted and connection management server 126 includes HTTP server 528. As discussed above with reference to FIG. 4, the keep alive value a connection setting 337 that can be changed using server side administrative application 339 (See FIGS. 10 and 11). Connection settings 337, including but not limited to the keep alive value, can also be set using an interface on mobile device 160 (See FIG. 13).

In step 404, the HTTP request is passed from connection management server 126 to the actual server that will process the request as described above with reference to FIG. 4.

In step 510, after the keep alive time period has expired, an HTTP post message containing a timeout indication is passed from connection management server 126 to mobile device 160. In this step, the request sent in step 402 has timed out prior to the corresponding HTTP response being prepared by web server 122 or enterprise server 128. In step 510, connection management server 126 will respond to mobile device 160 with an HTTP message that indicates the request sent in step 402 has timed out. According to an embodiment of the invention, the SendKeepAliveResponse function described above may be called by connection management server 126 in order to generate the HTTP post message sent in this step.

In step 512, a 're-post' containing a valid HTTP post with no data is sent from mobile device 160 to connection management server 126. The re-post sent in this step can be conceptualized as a 'dummy' request. In an embodiment, the dummy request sent in step 512 is created using the GetHttpChunkTerminator function described above. The re post sent in this step serves the purpose of keeping data flowing on connection 230 used by mobile device 160, thereby informing the wireless service provider for mobile device 160 that the connection is active. As the connection 230 is marked as active, wireless subscriber provider will not terminate the connection even though web server 122 has not responded within a timeout period. As described above with reference to FIGS. 1 and 3, a mobile device 160 may connect to one or enterprise servers 128 via a firewall server 124. In an embodiment, web server 122 associates the empty HTTP request sent in step 512 with the request sent in step 402 so that the two requests are seen as a single, active request. In an embodiment, the ReadKeepAliveRequest function described above may be invoked by connection management server 126 to read a dummy request from mobile device 160 sent in step 512.

In step 514, web server 122 responds with results from the HTTP request sent in step 402. In this step, the HTTP response is sent to connection management server after the timeout indicated as the keep alive value sent in step 402 has expired (i.e., after 240 seconds). The HTTP response sent in step 406 contains results requested in step 402.

In step 408, the HTTP response containing results is sent from connection management server to mobile device 160 as described above with reference to FIG. 4 and method 500 ends.

Figure 6:
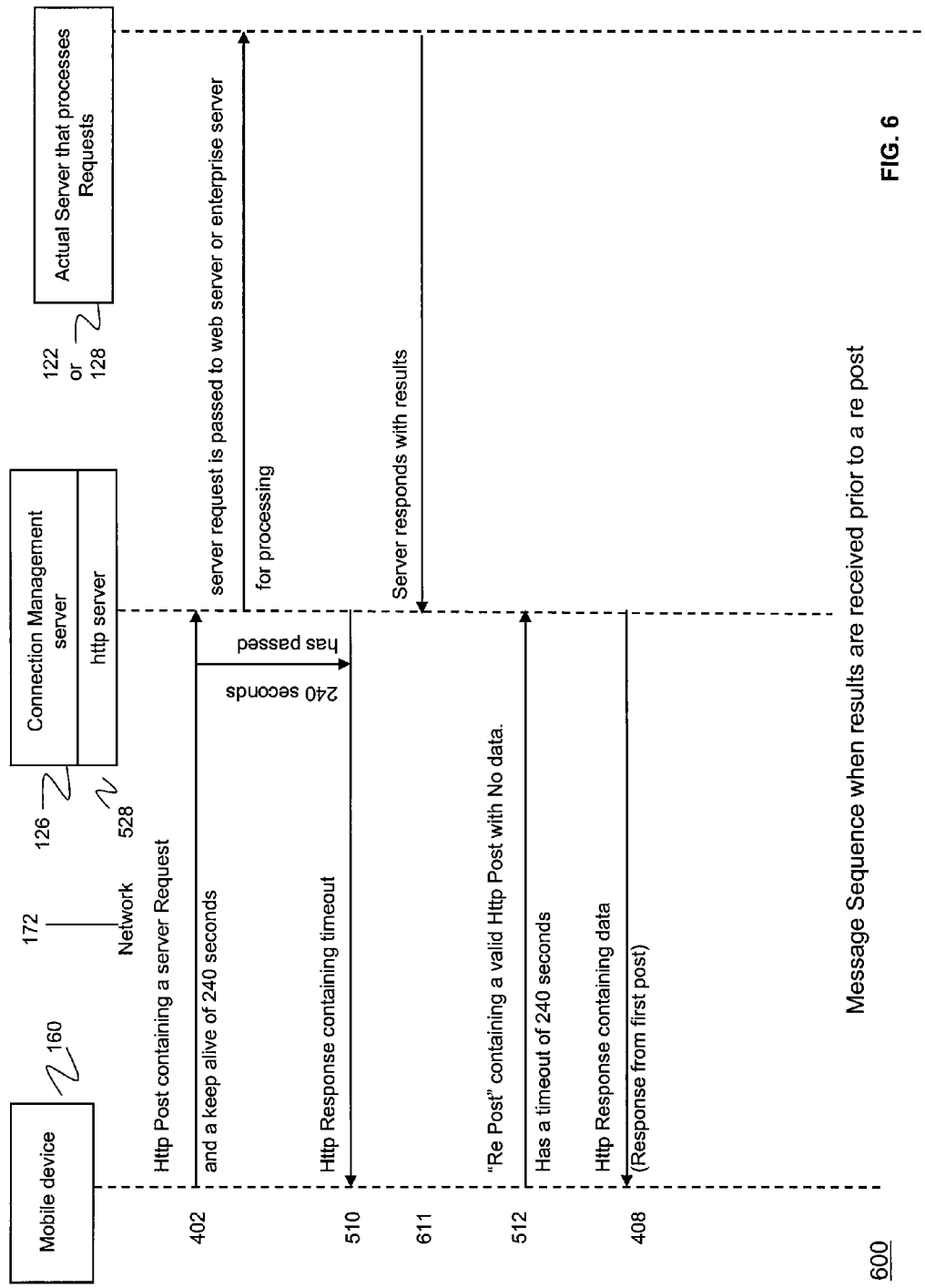

FIG. 6 is a message sequence chart depicting a method 600 for maintaining a connection between a mobile device and a server when the mobile device does not receive a response from a server within a predetermined timeout period.

FIG. 6 is described with continued reference to the embodiments illustrated in FIGS. 1-5. However, FIG. 6 is not limited to those embodiments.

Method 600 handles cases where an HTTP response from web server 122 or enterprise server 128 via network 172 is not received by mobile device 160 within a predetermined timeout period, but is sent before a re post is sent from mobile device 160. Although this embodiment is described in terms of a connection between a mobile device 160 and web server 122, it is applicable to other servers that process requests from a mobile device 160 such as enterprise servers 128. In FIG. 6, a 'dummy' HTTP request with no data is sent from mobile device 160 in order to keep a connection to web server 122 from being terminated.

Method 600 begins in step 402 when an HTTP post containing a server request and a keep alive value of 240 seconds is sent from mobile device 160 to connection management server 126. In the embodiment depicted in FIG. 6, a keep alive value of 240 seconds is shown. As discussed above with reference to FIGS. 4 and 5, the keep alive value can be set using a server side administrative application or an interface on mobile device 160.

In step 404, the HTTP request is passed from connection management server 126 to the actual server that will process the request as described above with reference to FIG. 4.

In step 510, after the expiration of the keep alive time period, an HTTP post message containing a timeout indication is passed from connection management server 126 to mobile device 160 as described above with reference to FIG. 5.

In step 611, web server 122 responds with results from the HTTP request sent in step 402. As in step 510, this step occurs after the keep alive time period has expired.

In step 512, a re-post containing a valid HTTP post with no data is sent from mobile device 160 to connection management server 126 as described above with reference to FIG. 5. This step achieves the result of keeping the connection between mobile device 160 and web server 122 active while mobile device 160 awaits receipt of the HTTP response to be forwarded by connection management server 126.

In step 614, the HTTP response containing results is sent from connection management server 126 to mobile device 160. In an embodiment, this step entails sending the response via connection 230 illustrated in FIGS. 2 and 3. Once the response is received by mobile device 160, method 600 ends.

Figure 7:
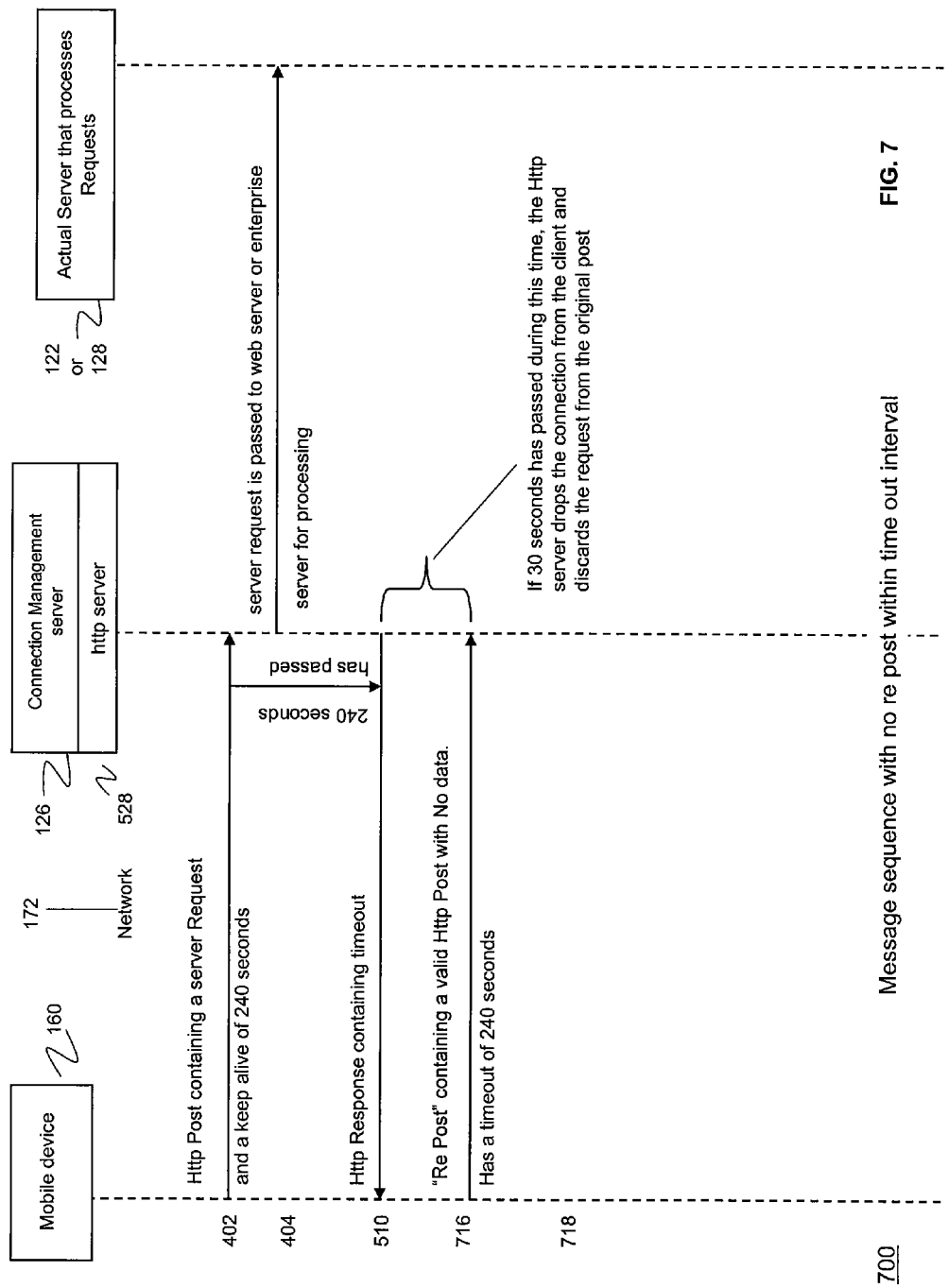
Figure 8:
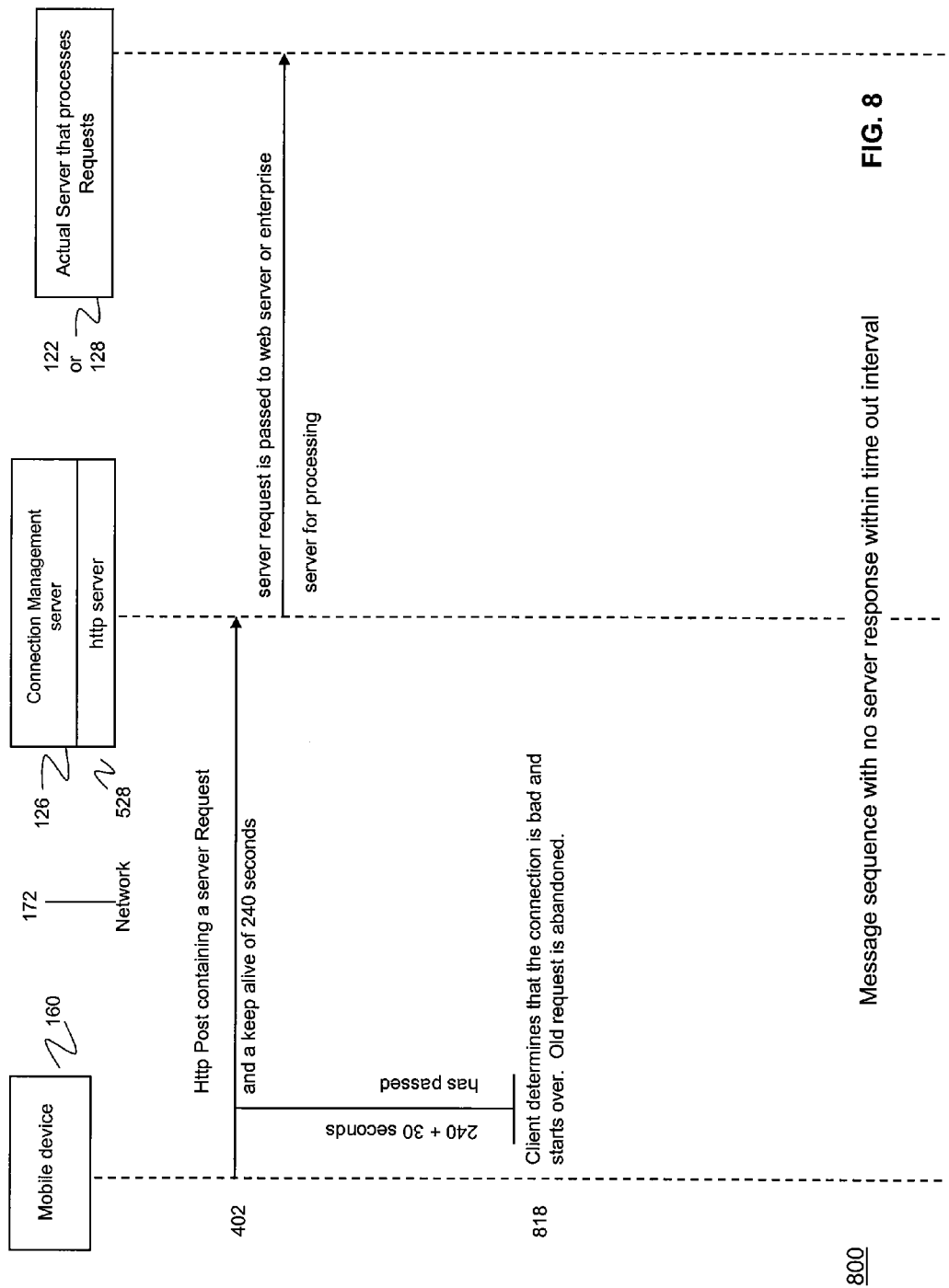

FIGS. 7 and 8 depict methods for handling errors due to slow or dropped connections.

FIG. 7 is a message sequence chart illustrating a method 700 for discarding a request from a mobile device to a server when the mobile device does not send a re post within a predetermined timeout period.

FIG. 7 is described with continued reference to the embodiments illustrated in FIGS. 1-6. However, FIG. 7 is not limited to those embodiments.

Method 700 handles cases where an HTTP response from web server 122 or enterprise server 128 via network 172 is not received by mobile device 160 within a predetermined timeout period, and a re post is not sent from mobile device 160 within an additional time period. Although this embodiment is described in terms of a connection between a mobile device 160 and web server 122, it is applicable to other servers that process requests from a mobile device 160 such as enterprise servers 128.

Method 700 begins in step 402 when an HTTP post containing a server request and a keep alive value of 240 seconds is sent from mobile device 160 to connection management server 126 as described above with reference to FIG. 4.

In step 404, the HTTP request is passed from connection management server 126 to the actual server that will process the request as described above with reference to FIG. 4.

In step 510, after the expiration of the keep alive time period, an HTTP post message containing a timeout indication is passed from connection management server 126 to mobile device 160 as described above with reference to FIG. 5.

In step 716, a re-post containing a valid HTTP post with no data is sent from mobile device 160 to connection management server 126 after the passage of an additional time period.

In the example embodiment depicted in FIG. 7, step 716 occurs 30 seconds after step 510 has completed. This additional time period (e.g., 30 seconds in the exemplary embodiment depicted in FIG. 7) can be conceptualized as a re post timeout. In accordance with an embodiment of the invention, the re post timeout is a connection setting 337 that can be set and changed using server side administrative application 339.

In step 718, after the expiration of the re post timeout, connection management server 126 drops connection 230 from mobile device 160. In this step, the HTTP request from step 402 is discarded and method 700 ends.

FIG. 8 is described with continued reference to the embodiments illustrated in FIGS. 1-7. However, FIG. 8 is not limited to those embodiments.

Method 800 handles cases where an HTTP response from web server 122 or enterprise server 128 via network 172 is not received by mobile device 160 within a predetermined timeout period, and an HTTP post message containing a timeout indication is not received by mobile device within an additional time period. While this embodiment is described in terms of a connection between a mobile device 160 and web server 122, it is applicable to other servers that process requests from a mobile device 160 such as enterprise servers 128.

Method 800 begins in step 402 when an HTTP post containing a server request and a keep alive value of 240 seconds is sent from mobile device 160 to connection management server 126 as described above with reference to FIG. 4.

In step 404, the HTTP request is passed from connection management server 126 to the actual server that will process the request as described above with reference to FIG. 4.

In step 818, mobile device 160 determines that connection 230 is unreliable after the passage of an additional time period. In the example embodiment depicted in FIG. 8, step 818 occurs 30 seconds after the keep alive time period sent in step 402 has passed. This additional time period (e.g., 30 seconds in the exemplary embodiment depicted in FIG. 8) can be conceptualized as a connection timeout. In an embodiment of the invention, the connection timeout is one of the connection settings 337 which can be set and changed using server side administrative application 339. In step 818, after the expiration of the connection timeout, the client determines that connection 230 to connection management server 126 has been dropped and the HTTP request from step 402 is abandoned, and method 700 ends.

Example Graphical User Interfaces

FIGS. 9-13 depict example graphical user interfaces (GUIs) for displaying and editing connection information pertaining to a mobile device. In an embodiment of the invention, server side administration application 339 may include the exemplary interface illustrated in FIGS. 9 and 10. According to an embodiment of the present invention, mobile device 160 may include the exemplary interface illustrated in FIGS. 1-13. FIGS. 9-13 are described with continued reference to the embodiments illustrated in FIGS. 1-3. However, FIGS. 9-13 are not limited to those embodiments. Throughout FIGS. 9-13, displays are shown with various hyperlinks, command regions, tabs, buttons, checkboxes, and data entry fields, which are used to initiate action, invoke routines, enter data, view data, or invoke other functionality. For brevity, only the differences occurring within the figures, as compared to previous or subsequent ones of the figures, are described below.

Figure 9:
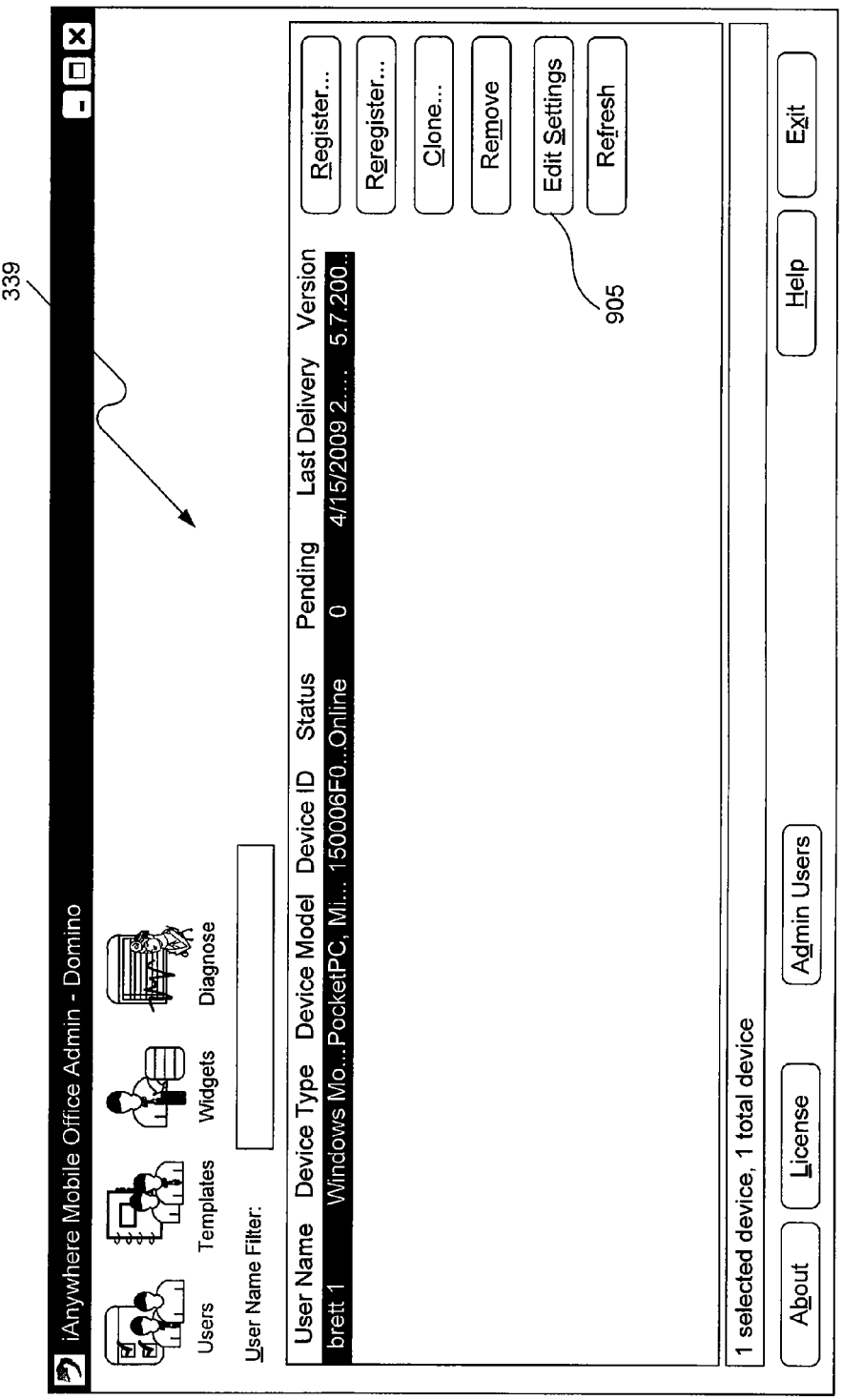
FIGS. 9 and 10 depict a server-side administrative graphical user interface (GUI) for a connection maintenance system, according to an embodiment of the invention.
Figure 10:
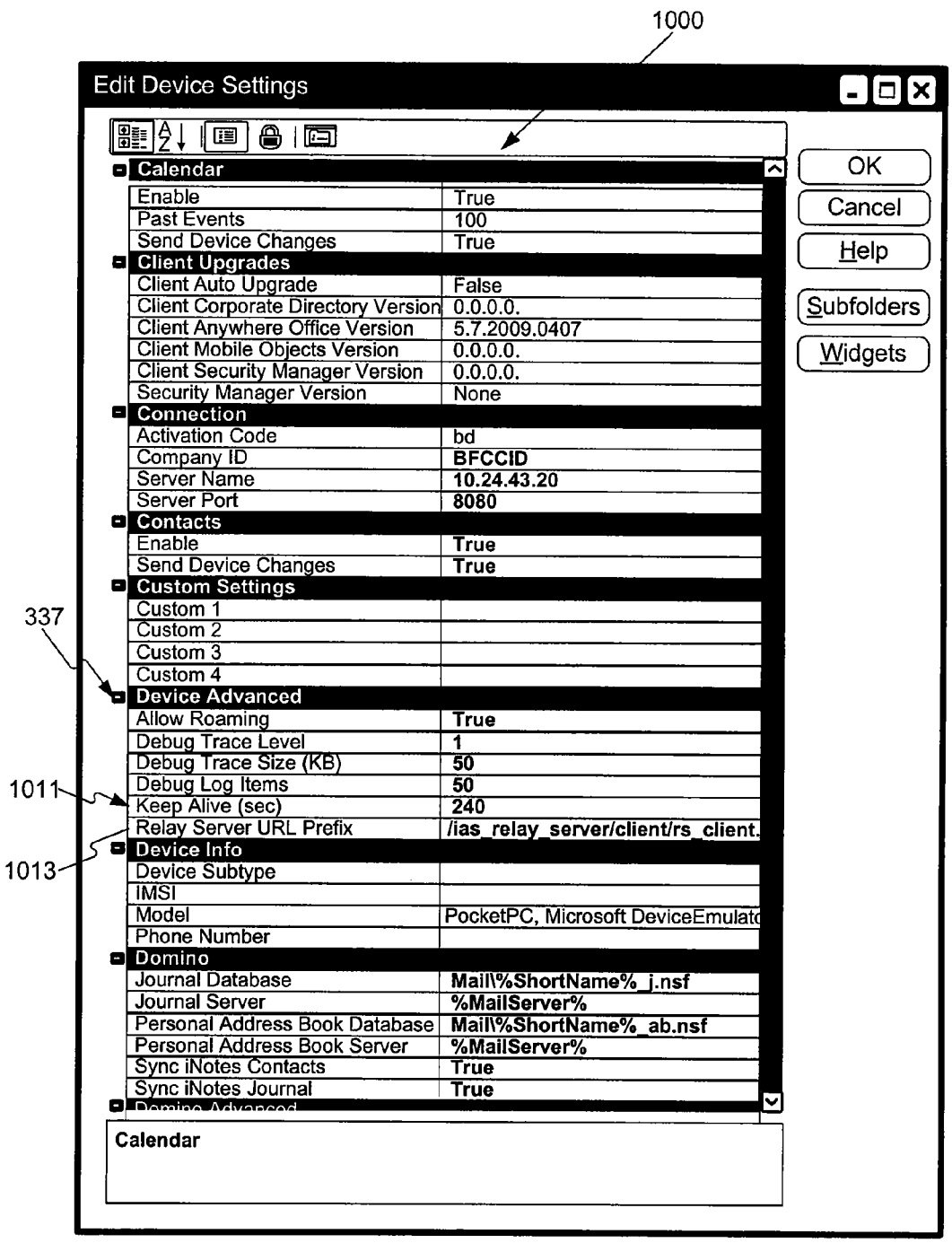

FIGS. 9 and 10 illustrate an exemplary GUI for viewing and editing connection information for a mobile device 160, in accordance with an embodiment of the invention.

FIG. 9 illustrates a top-level interface for server side administrative application 339. In the example embodiment depicted in FIG. 9, button 905 can be used by an administrator to edit connection settings pertaining to a mobile device 160. In the example embodiment depicted in FIG. 9, an administrator, using an input device, may select button 905 to invoke the GUI illustrated in FIG. 10.

FIG. 10 depicts an interface 1000 for displaying and editing connection settings 337 associated with a mobile device 160. In an embodiment, an administrator may set keep alive value 1011 using an input device in order to tune the timeout values described with reference to methods 500-800 illustrated in FIGS. 5-8. Interface 1000 allows an administrator to set an interval (in seconds), keep alive value 1011, at which mobile device 160 and connection management server 126 communicate in order to maintain connection 230. In the example embodiment depicted in FIG. 10, keep alive value 1011 has been set to 240 seconds, but keep alive value 1011 can be adjusted as needed using interface 1000. Interface 1000 also allows an administrator to display and edit a uniform resource locator (URL) relay server prefix 1013. URL relay server prefix 1013 may be used to specify the URL prefix to be used when mobile device 160 is connecting through a relay server. In an embodiment of the invention, the relay server is between connection management server 126 and web server 122. In another embodiment, the relay server is between connection management server 126 and firewall server 124.

Figure 11:
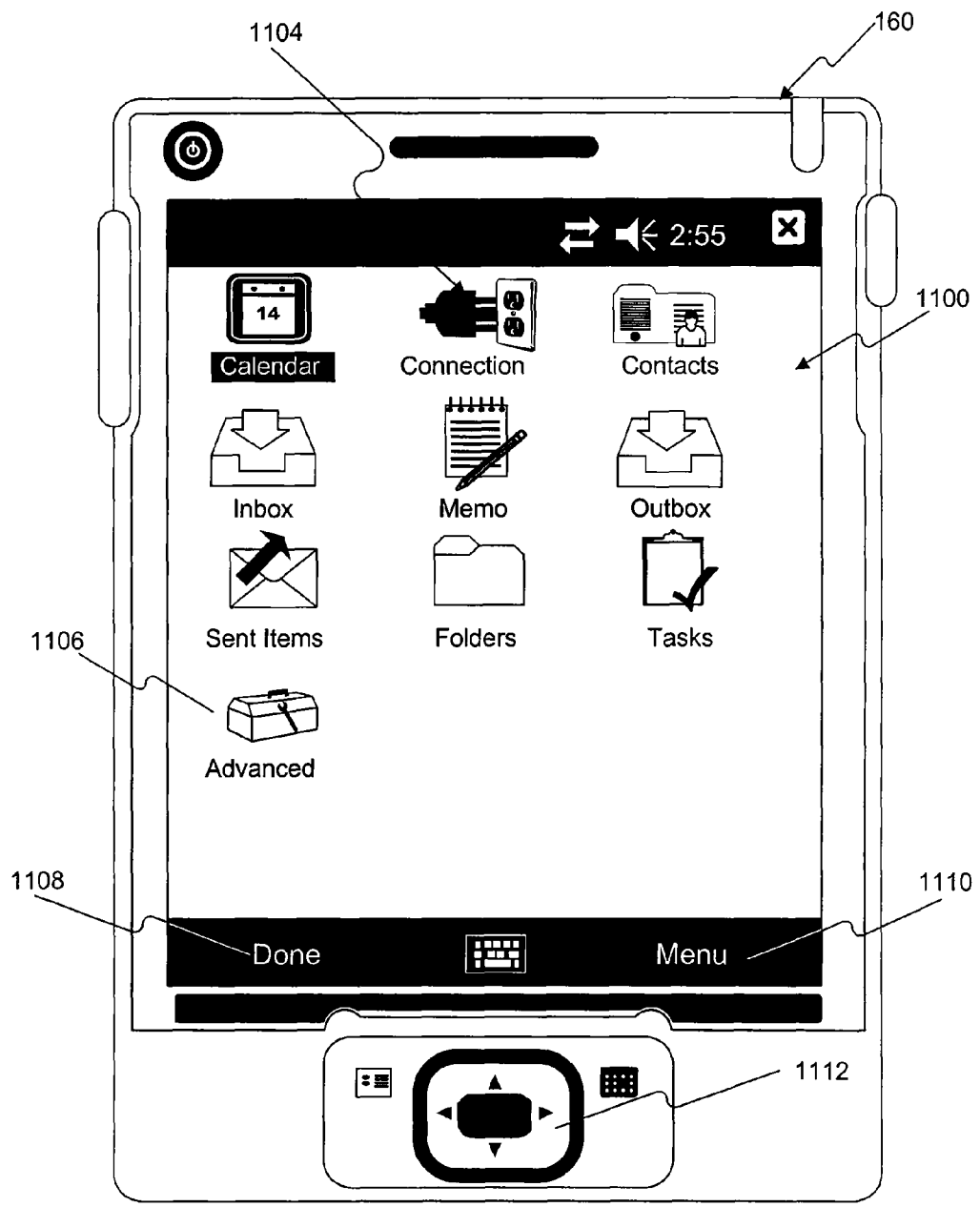
FIGS. 11-13 depict a GUI for a mobile client device to display and edit connection settings, according to an embodiment of the invention.
Figure 12:
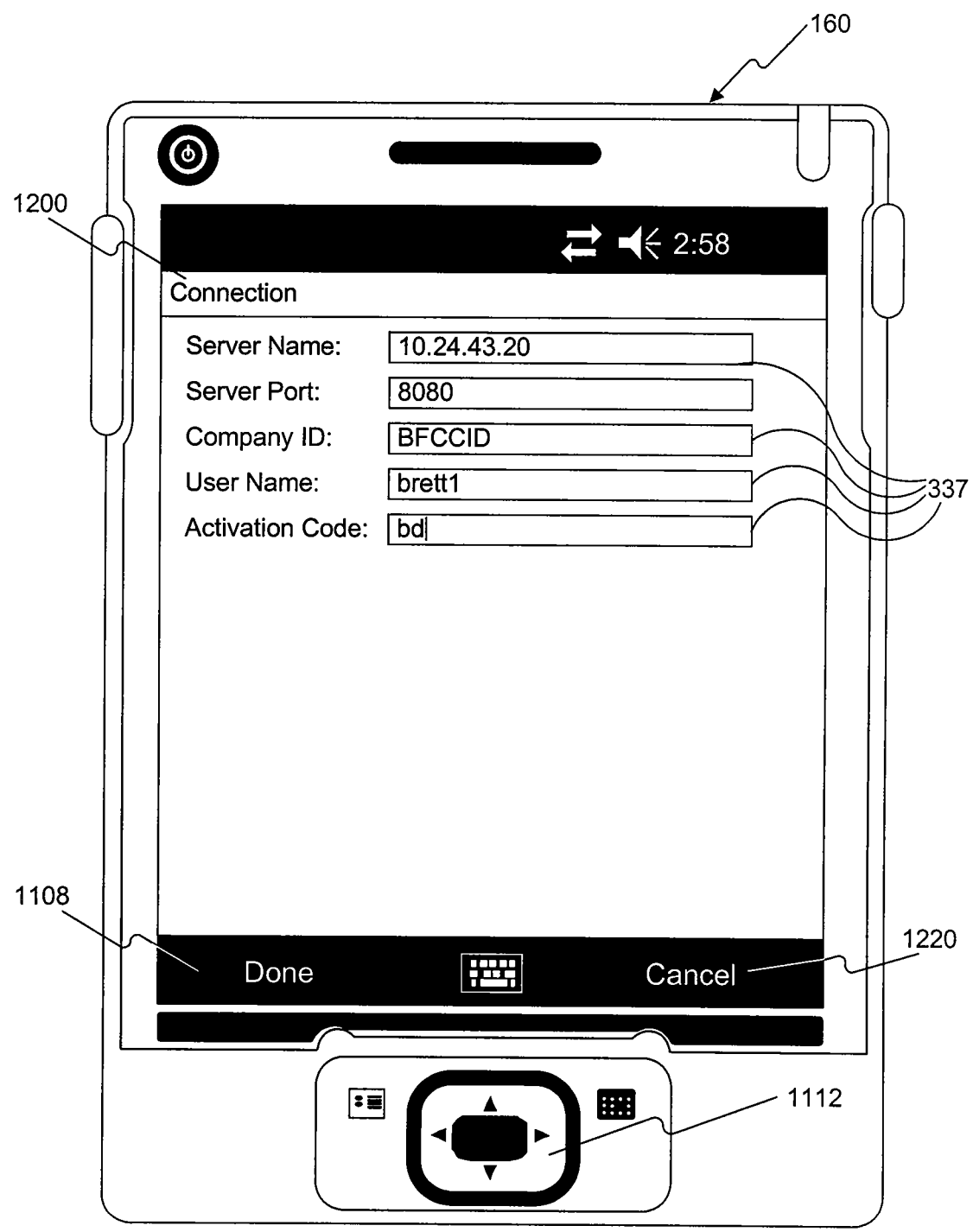
Figure 13:
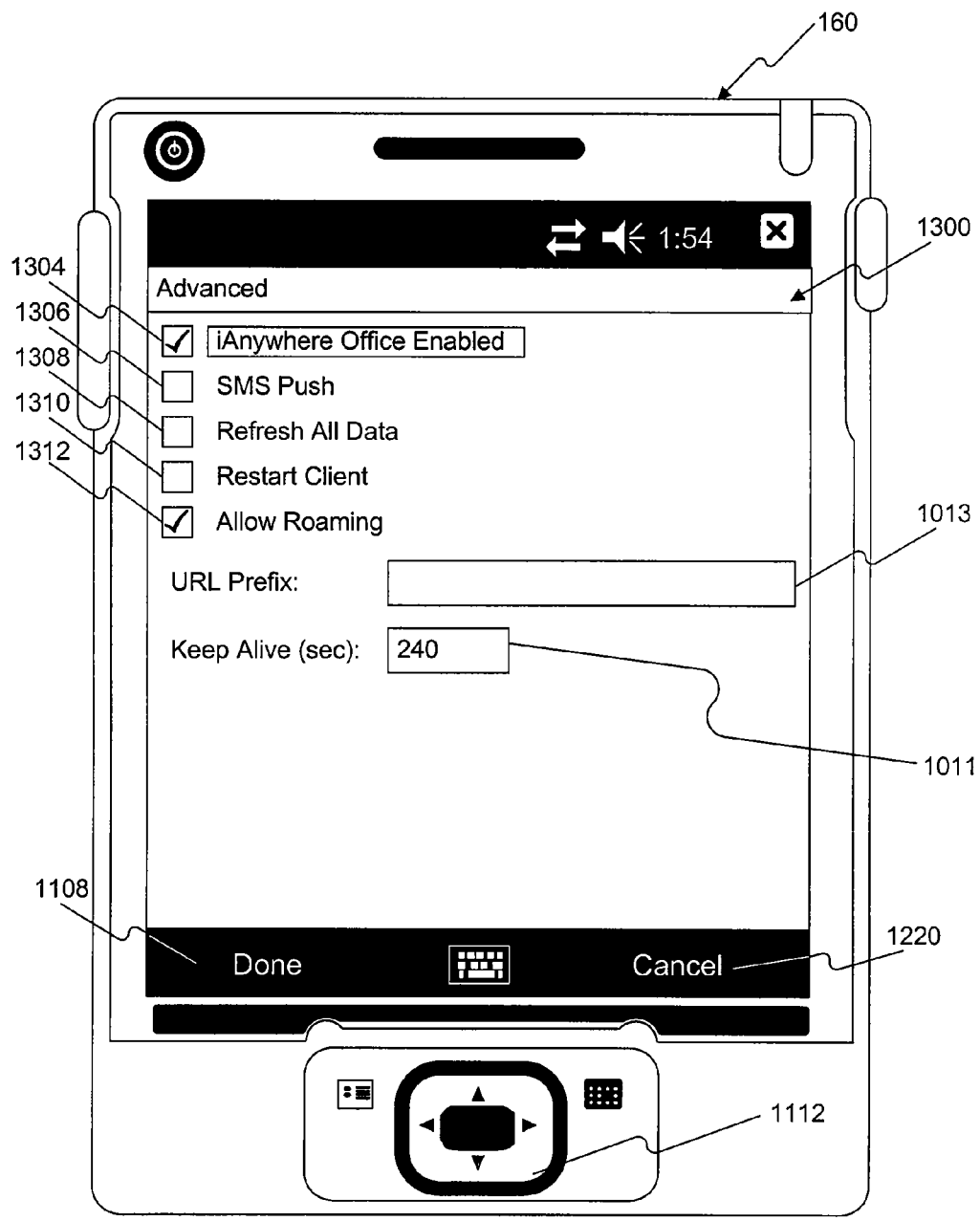

FIGS. 11-13 depict an exemplary mobile device interface 1100 for viewing and editing connection settings 337 on a mobile device 160, in accordance with an embodiment of the present invention.

FIG. 11 depicts an top-level desktop for interface 1100 which allows a user, using input device 1112, to select connection icon 1104 and advanced icon 1106. Selection of connection icon 1104 invokes interface 1200 depicted in FIG. 12 and described below with reference to FIG. 12. Selection of advanced icon 1106 invokes interface 1300 depicted in FIG. 13 and described below with reference to FIG. 13. Done button 1108 can be selected to exit interface 1100 and menu button 1110 can be selected to invoke a menu on mobile device 160.

FIG. 12 depicts connection interface 1200 that allows a user, using input device 1112, to set connection settings 337 for mobile device 160. Connection settings 337 are configurable on mobile device 160 using interface 1200. As shown in the example embodiment of FIG. 12, connection settings 337 include, but are not limited to, a name or Internet Protocol (IP) address and port for connection management server 126. As shown in FIG. 12, connection settings 337 may also include a company identifier (ID), user name, and activation code associated with mobile device 160 so that mobile device 160 can be authenticated by connection management server 126. Cancel button 1220 can be selected to cancel any changes made to connection settings 337 on mobile device 160.

FIG. 13 depicts advanced interface 1300 that allows a user, using input device 1112, to set additional connection settings 337 for mobile device 160. These additional connection settings 337 are described below.

A user, using input device 1112 can select mobile office engine check box 1304 to enable or disable a mobile office engine on mobile device 160. In an embodiment, the mobile office engine comprises a set of instructions stored in a computer readable medium on mobile device 160, that if executed, enable mobile device 160 to perform some of the steps depicted in FIGS. 4-8. These steps include, but are not limited to, steps 402, 510, and 716. In an embodiment of the present invention, commercially available software such as the iAnywhere Mobile Office engine may be used to perform the functions of the mobile office engine.

A user, using input device 1112 can select SMS Push check box 1306 to switch from an IP Push to an SMS Push for an automatic send/receive data exchange with connection management server 126. Unlike an IP push, which maintains a persistent IP connection, an SMS-based push uses an IP connection only long enough for the send/receive data exchange to complete. The SMS push feature overcomes network issues with always-on connectivity and battery life consumption on wireless third generation (3G) networks. Mobile office engine check box 1304 must first be selected (i.e., checked) for the SMS Push to work. When SMS Push check box 1306 is selected, any changes on mobile device 160 causes an IP connection to be established with connection management server 126 in order to exchange the changes made on mobile device 160. In an embodiment, connection 230 may be the IP connection.

A user, using input device 1112, can select refresh check box 1308 to refresh all data on mobile device 160. In an embodiment, selection of refresh check box 1308 causes a reload of email and PIM data from an enterprise server 128.

A user, using input device 1112, can select restart check box 1310 to restart the mobile office engine described above with reference to mobile office engine check box 1304.

A user, using input device 1112, can select roaming check box 1312 to control whether the mobile device 160 is allowed to maintain a persistent connection to connection management server 126 when mobile device 160 is not on its carrier's home wireless network. If available, the send/receive functionality described above with reference to SMS Push check box 1306 can still be used when mobile device 160 is roaming. According to an embodiment, after a roaming occurrence and when mobile device 160 is back on the carrier's home network, mobile device 160 automatically switches back to a persistent connection if roaming check box 1312 is selected.

A user, using input device 1112, can enter a keep alive value 1011 in a data entry field within interface 1300. In the embodiment shown in FIG. 13, a user can set a keep alive value 1011 in seconds representing the interval at which mobile device 160 and connection management server 126 communicate to maintain connection 230.

A user, using input device 1112, can enter URL relay server prefix 1013 in a data entry field within interface 1300. As discussed above with reference to FIG. 10, URL relay server prefix 1013 specifies the URL prefix to be used when mobile device 160 is connecting through the relay server.

Example Computer System Implementation

Figure 14:
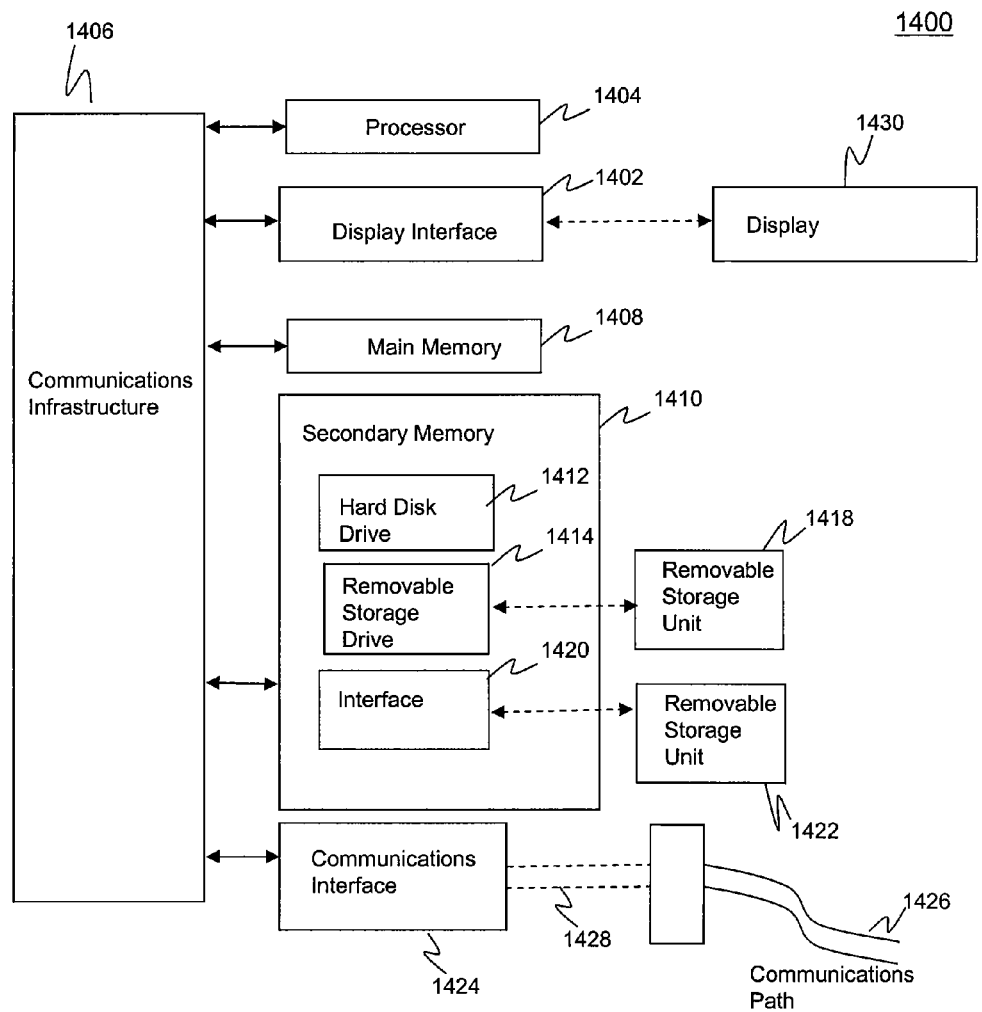
FIG. 14 depicts an example computer system in which the present invention may be implemented.

Various aspects of the present invention can be implemented by software, firmware, hardware, or a combination thereof. FIG. 14 illustrates an example computer system 1400 in which the present invention, or portions thereof, can be implemented as computer-readable code. For example, the methods illustrated by message sequence charts FIGS. 4-8 can be implemented in computer system 1400. Various embodiments of the invention are described in terms of this example computer system 1400. After reading this description, it will become apparent to a person skilled in the relevant art how to implement the invention using other computer systems and/or computer architectures.

Computer system 1400 includes one or more processors, such as processor 1404. Processor 1404 can be a special purpose or a general purpose processor. Processor 1404 is connected to a communication infrastructure 1406 (for example, a bus, or network).

Computer system 1400 also includes a main memory 1408, preferably random access memory (RAM), and may also include a secondary memory 1410. Secondary memory 1410 may include, for example, a hard disk drive 1412, a removable storage drive 1414, flash memory, a memory stick, and/or any similar non-volatile storage mechanism. Removable storage drive 1414 may comprise a floppy disk drive, a magnetic tape drive, an optical disk drive, a flash memory, or the like. The removable storage drive 1414 reads from and/or writes to a removable storage unit 1418 in a well known manner. Removable storage unit 1418 may comprise a floppy disk, magnetic tape, optical disk, etc. which is read by and written to by removable storage drive 1414. As will be appreciated by persons skilled in the relevant art(s), removable storage unit 1418 includes a computer usable storage medium having stored therein computer software and/or data.

In alternative implementations, secondary memory 1410 may include other similar means for allowing computer programs or other instructions to be loaded into computer system 1400. Such means may include, for example, a removable storage unit 1422 and an interface 1420. Examples of such means may include a program cartridge and cartridge interface (such as that found in video game devices), a removable memory chip (such as an EPROM, or PROM) and associated socket, and other removable storage units 1422 and interfaces 1420 which allow software and data to be transferred from the removable storage unit 1422 to computer system 1400.

Computer system 1400 may also include a communications interface 1424. Communications interface 1424 allows software and data to be transferred between computer system 1400 and external devices. Communications interface 1424 may include a modem, a network interface (such as an Ethernet card), a communications port, a PCMCIA slot and card, or the like. Software and data transferred via communications interface 1424 are in the form of signals which may be electronic, electromagnetic, optical, or other signals capable of being received by communications interface 1424. These signals are provided to communications interface 1424 via a communications path 1426. Communications path 1426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1418, removable storage unit 1422, and a hard disk installed in hard disk drive 1412. Signals carried over communications path 1426 can also embody the logic described herein. Computer program medium and computer usable medium can also refer to memories, such as main memory 1408 and secondary memory 1410, which can be memory semiconductors (e.g. DRAMs, etc.). These computer program products are means for providing software to computer system 1400.

Computer programs (also called computer control logic) are stored in main memory 1408 and/or secondary memory 1410. Computer programs may also be received via communications interface 1424. Such computer programs, when executed, enable computer system 1400 to implement the present invention as discussed herein. In particular, the computer programs, when executed, enable processor 1404 to implement the processes of the present invention, such as the steps in the methods illustrated by message sequence charts 500-800 of FIGS. 5-8 discussed above. Accordingly, such computer programs represent controllers of the computer system 1400. Where the invention is implemented using software, the software may be stored in a computer program product and loaded into computer system 1400 using removable storage drive 1414, interface 1420, hard drive 1412, or communications interface 1424.

The invention is also directed to computer program products comprising software stored on any computer usable medium. Such software, when executed in one or more data processing device, causes a data processing device(s) to operate as described herein. Embodiments of the invention employ any computer usable or readable medium, known now or in the future. Examples of computer usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for maintaining a connection between a mobile device and a data server, the method comprising:
   receiving a data request from the mobile device, the data request identifying at least a configurable keep alive time interval;
   sending the data request to the data server;
   determining whether the configurable keep alive time interval has expired;
   sending a message to the mobile device indicating that the data request has timed out if it is determined that the configurable keep alive time interval has expired;
   receiving are post request from the mobile device, the re post request identifying at least the configurable keep alive time interval;
   receiving a response from the data server, wherein the response includes at least data requested by the mobile device; and
   sending the response to the mobile device.

2. The method of claim 1, wherein receiving the data request comprises receiving a Hypertext Transfer Protocol (HTTP) request.

3. The method of claim 2, wherein the HTTP request includes at least an HTTP header value indicating the configurable keep alive time interval.

4. The method of claim 2 wherein the message indicating that the data request has timed out is an HTTP response including at least an HTTP header value indicating that the configurable keep alive time interval has expired.

5. The method of claim 1, wherein the configurable keep alive time interval is configurable on the mobile device.

6. The method of claim 1, wherein the data request from the mobile device is received at a connection management server configured to perform the determining and wherein the connection management server is further configured to generate a message indicating that the data request has timed out if it is determined that the configurable keep alive time interval has expired.

7. The method of claim 6, wherein the configurable keep alive time interval is configurable on the connection management server.

8. The method of claim 1, wherein the data server is one or more of a web server, an email server, a file server, a database server, and an application server.

9. The method of claim 8, wherein the email server is one or more of a Lotus Domino server, a Microsoft Exchange server, a Lotus Notes server, and a Novell GroupWise server.

10. The method of claim 1, wherein the mobile device is one or more of a personal digital assistant (PDA), a device running a mobile operating system, a device running a Symbian operating system, a mobile phone, a smart phone, a hand held computer, a palmtop computer, a laptop computer, and an ultra-mobile PC.

11. A non-transitory computer-readable medium having stored thereon, computer-executable instructions that, if executed by a connection management system, cause the connection management system to maintain a connection between a mobile device and a data server by a method comprising:
    receiving a data request from the mobile device, the data request identifying at least a configurable keep alive time interval;
    sending the data request to the data server;
    determining whether the configurable keep alive time interval has expired;
    sending a message to the mobile device indicating that the data request has timed out if it is determined that the configurable keep alive time interval has expired;
    receiving are post request from the mobile device, wherein the re post request identifies at least the configurable keep alive time interval;
    receiving a response from the data server, wherein the response includes at least data requested by the mobile device; and
    sending the response to the mobile device.

12. The non-transitory computer-readable medium of claim 11, wherein receiving the data request further comprises receiving a HTTP request.

13. The non-transitory computer-readable median, of claim 12, wherein the HTTP request includes at least an HTTP header value indicating the configurable keep alive time interval.

14. The non-transitory computer-readable medium of claim 12 wherein the message indicating that the data request has timed out is an HTTP response including at least an HTTP header value indicating that the configurable keep alive time interval has expired.

15. The non-transitory computer-readable medium of claim 11 wherein the configurable keep alive time interval is configurable on the connection management system and on the mobile device.

16. The non-transitory computer-readable medium of claim 11, wherein the data server is one or more of a web server and a firewall server.

17. A system capable of maintaining a connection between a mobile device and a data server, the system comprising:
    a connection management server;
    a request receiving module configured to receive, at the connection management server, a data request from the mobile device, the data request identifying at least a configurable keep alive time interval;

a forwarding module configured to transmit the data request to the data server;

a determining module configured to determine whether the configurable keep alive time interval has expired;

a timeout module configured to send a message from the connection management server to the mobile device indicating that the data request has timed out if it is determined that the configurable keep alive time interval has expired;

are post module configured to receive at the connection management server, a re post request from the mobile device, the re post request identifying at least the configurable keep alive time interval;

a response receiving module configured to receive, at the connection management server, a response from the data server, wherein the response includes at least data requested by the mobile device; and a response transmission module configured to send the response from the connection management server to the mobile device.

18. The system of claim 17, wherein the data server is one or more of a web server, an email server, a file server, a database server, and an application server.

19. The system of claim 18, wherein the email server is one or more of a Lotus Domino server, a Microsoft Exchange server, a Lotus Notes server, and a Novell GroupWise server.

20. The system of claim 17, wherein the mobile device is one or more of a personal digital assistant (PDA), a device running a mobile operating system, a device running a Symbian operating system, a mobile phone, a smart phone, a hand held computer, a palmtop computer, a laptop computer, and an ultra-mobile PC.

* * * * *

UNITED STATES PATENT AND TRADEMARK OFFICE
CERTIFICATE OF CORRECTION

PATENT NO.       : 8,024,423 B2  
APPLICATION NO.  : 12/432339  
DATED            : September 20, 2011  
INVENTOR(S)      : Donahue et al.

Page 1 of 1

It is certified that error appears in the above-identified patent and that said Letters Patent is hereby corrected as shown below:

Column 21
Line 46, Claim 1, please replace "receiving are post request" with --receiving a re post request--.

Column 22
Line 35, Claim 11, please replace "receiving are post request" with --receiving a re post request--.

Column 22
Line 45, Claim 13, please replace "median, of" with --medium of--.

Column 22
Line 50, Claim 14, please replace "claim 12 wherein" with --claim 12, wherein--.

Column 22
Line 55, Claim 15, please replace "claim 11 wherein" with --claim 11, wherein--.

Column 23
Line 10, Claim 17, please replace "are post module configured to receive at the connection" with --a re post module configured to receive, at the connection--.

Signed and Sealed this
Thirty-first Day of January, 2012

David J. Kappos
*Director of the United States Patent and Trademark Office*